US012640577B2

(12) United States Patent
Chang et al.

(10) Patent No.: US 12,640,577 B2
(45) Date of Patent: May 26, 2026

(54) CHARGING CONTROL METHOD AND CHARGING SYSTEM CAPABLE OF TRACKING MAXIMUM EFFICIENCY

(71) Applicant: Richtek Technology Corporation, HsinChu (TW)

(72) Inventors: Wei-Hsu Chang, Hsinchu (TW); Ta-Yung Yang, Taoyuan (TW)

(73) Assignee: RICHTEK TECHNOLOGY CORPORATION, Zhubei City (TW)

( * ) Notice: Subject to any disclaimer, the term of this patent is extended or adjusted under 35 U.S.C. 154(b) by 916 days.

(21) Appl. No.: 17/829,394

(22) Filed: Jun. 1, 2022

(65) Prior Publication Data

US 2022/0407336 A1      Dec. 22, 2022

(30) Foreign Application Priority Data

Jun. 21, 2021    (TW) ................................. 110122634

(51) Int. Cl.
H02J 7/00 (2006.01)
H02M 1/00 (2007.01)

(52) U.S. Cl.
CPC ........ H02J 7/00712 (2020.01); H02M 1/0009 (2021.05); H02M 1/0012 (2021.05); *H02J 2207/20* (2020.01)

(58) Field of Classification Search
CPC .............. H02J 7/00712; H02J 2207/20; H02J 2207/30; H02J 1/06; H02J 7/00034;
(Continued)

(56) References Cited

U.S. PATENT DOCUMENTS 6,137,265 A     10/2000   Cummings et al.
6,144,187 A     11/2000   Bryson
(Continued)

FOREIGN PATENT DOCUMENTS

CN          103312143 A       9/2013
CN          111267649 A   *   6/2020

OTHER PUBLICATIONS

J. A. Abu-Qahouq, H. Mao, H. J. Al-Atrash and I. Batarseh, "Maximum efficiency point tracking (MEPT) method and dead time control," 2004 IEEE 35th Annual Power Electronics Specialists Conference (IEEE Cat. No. 04CH37551), Aachen, Germany, 2004, pp. 3700-3706 vol. 5, doi: 10.1109/PESC.2004.1355130. (Year: 2004).*

(Continued)

*Primary Examiner* — Julian D Huffman
*Assistant Examiner* — Aiman Bickiya
(74) *Attorney, Agent, or Firm* — Tung & Associates

(57)      ABSTRACT
A charging control method includes: converting an input power to a DC power; receiving the DC power by a detachable cable to generate a bus power; converting the bus power to a charging power for charging a battery in a charging period; and adjusting the DC power and/or the charging power to track a maximum of a power conversion efficiency; wherein the power conversion efficiency includes one of the following: an input power conversion efficiency, which is a conversion efficiency of converting the input power to the charging power; a DC power conversion efficiency, which is a conversion efficiency of converting the DC power to the charging power; or a bus power conversion efficiency, which is a conversion efficiency of converting the bus power to the charging power.

22 Claims, 17 Drawing Sheets

(58) Field of Classification Search
CPC ............. H02M 1/0009; H02M 1/0012; H02M
1/0032; H02M 3/1584; H02M 3/07;
H02M 3/158
USPC ......................................................... 320/142
See application file for complete search history.

(56) References Cited

U.S. PATENT DOCUMENTS

| | | | |
|---|---|---|---|
| 10,044,217 B2 | 8/2018 | Huang et al. | |
| 2015/0028839 A1* | 1/2015 | Petrovic | H02M 3/07 |
| | | | 323/311 |
| 2018/0083456 A1* | 3/2018 | Huang | H02J 7/02 |
| 2018/0115246 A1* | 4/2018 | Azrai | G06F 1/26 |

OTHER PUBLICATIONS

T.-D. Yeo, D. Kwon, S.-T. Khang and J.-W. Yu, "Design of Maximum Efficiency Tracking Control Scheme for Closed-Loop Wireless Power Charging System Employing Series Resonant Tank," in IEEE Transactions on Power Electronics, vol. 32, No. 1, pp. 471-478, Jan. 2017, doi: 10.1109/TPEL.2016.2523121. (Year: 2017).*
"Maximum Efficiency Tracking for Wireless Power Transfer Systems With Dynamic Coupling Coefficient Estimation", by X. Dai et al., IEEE Transactions on Power Electronics, vol. 33, No. 6, Jun. 2018.

* cited by examiner

CHARGING CONTROL METHOD AND CHARGING SYSTEM CAPABLE OF TRACKING MAXIMUM EFFICIENCY

CROSS REFERENCE

The present invention claims priority to TW 110122634 filed on Jun. 21, 2021.

BACKGROUND OF THE INVENTION

Field of Invention

The present invention relates to a charging control method and a charging system; particularly, it relates to such charging control method capable of tracking maximum efficiency. Besides, the present invention also relates to a charging device and a charging circuit therein which adopt such charging control method.

Description of Related Art

Please refer to FIG. 1, which shows a schematic circuit diagram of a conventional charging system 1. The charging system 1 converts an input power to generate a charging power for charging a battery 19. As shown in FIG. 1, the charging system 1 comprises: a power delivery unit 11, a cable 13 and a portable device 14. The power delivery unit converts the input power to generate a DC power, wherein the input power includes an input voltage Vin and an input current Iin, and the DC power includes a DC voltage Vdc and a DC current Idc. The cable 13 includes: a power line and a communication bus. The cable 13 receives the DC power and outputs a bus power, wherein the bus power includes a bus voltage Vbus and a bus current Ibus. The portable device 14 converts the bus power to generate a charging power for charging the battery 19 in the portable device 14. The portable device 14 includes the battery 19, a charging circuit 15 and a maximum charging current controller 17. The charging power includes a charging voltage Vbat and a charging current Ibat.

During a charging period, the maximum charging current controller 17 can control the charging circuit 15 to charge the battery 19 by a maximum current of the charging current Ibat, if the condition allows, thereby fast charging the battery 19. However, during this charging period, the charging system 1 of the prior art shown in FIG. 1 has a low power conversion efficiency.

The following prior arts are relevant to the present invention: U.S. Pat. Nos. 6,137,265, 6,144,187 and "Maximum Efficiency Tracking for Wireless Power Transfer Systems With Dynamic Coupling Coefficient Estimation", by X. Dai et al., IEEE Transactions on Power Electronics, Vol. 33, No. 6, June 2018.

SUMMARY OF THE INVENTION

From one perspective, the present invention provides a charging control method, comprising: converting an input power to a DC power; receiving the DC power via a detachable cable, so as to generate a bus power; converting the bus power to a charging power for charging a battery in a charging period; and adjusting the DC power and/or the charging power, so as to track a maximum of a power conversion efficiency (maximum power conversion efficiency); wherein the power conversion efficiency includes one of the following: an input power conversion efficiency, which is a conversion efficiency for converting the input power to the charging power; a DC power conversion efficiency, which is a conversion efficiency for converting the DC power to the charging power; or a bus power conversion efficiency, which is a conversion efficiency for converting the bus power to the charging power.

From another perspective, the present invention provides a charging system, comprising: a power delivery unit, which is configured to operably convert an input power to a DC power; a detachable cable, which is configured to operably receive the DC power, and generate a bus power; and charging circuit, which is configured to operably convert the bus power to a charging power for charging a battery in a charging period; wherein the power delivery unit adjusts the DC power and/or the charging circuit adjusts the charging power, so as to track a maximum of a power conversion efficiency (maximum power conversion efficiency); wherein the power conversion efficiency includes one of the following: an input power conversion efficiency, which is a conversion efficiency for converting the input power to the charging power; a DC power conversion efficiency, which is a conversion efficiency for converting the DC power to the charging power; or a bus power conversion efficiency, which is a conversion efficiency for converting the bus power to the charging power.

In one embodiment, the step of adjusting the DC power to track the maximum power conversion efficiency includes the following steps: S11: obtaining the power conversion efficiency according to the DC power; S12: subsequent to the step S11, positively or negatively adjusting the DC power; S13: obtaining an adjusted power conversion efficiency according to the adjusted DC power; S14: subsequent to the step S13, comparing the adjusted power conversion efficiency with the power conversion efficiency before adjustment; S15: subsequent to the step S14, when the adjusted power conversion efficiency is higher than the power conversion efficiency before adjustment, adjusting the DC power in a same manner as the step S12 and executing the step S13; and S16: subsequent to the step S14, when the adjusted power conversion efficiency is not higher than the power conversion efficiency before adjustment, adjusting the DC power in an opposite manner as the step S12 and executing the step S13.

In one embodiment, the DC power includes a DC voltage and/or a DC current.

In one embodiment, during the charging period, a charging voltage and/or a charging current of the charging power is constant.

In one embodiment, the input power includes an input voltage and an input current, wherein the input voltage is constant; wherein when the power conversion efficiency is the input power conversion efficiency, the step of adjusting the DC power includes adjusting the DC power to track a minimum of the input current, so as to track a maximum of the input power conversion efficiency.

In one embodiment, the input power includes an input voltage and an input current; wherein the input voltage and/or the input current is detected and obtained by an analog digital conversion (ADC) circuit or wherein the input voltage and/or the input current is detected and obtained according to a DC voltage of the DC power and a look up table.

In one embodiment, the step of converting the bus power to generate the charging power is achieved by one of the following: (1) an inductive switching power converter or a capacitive switching power converter; or (2) a serial connection of the inductive switching power converter and the capacitive switching power converter or a parallel connection of the inductive switching power converter and the capacitive switching power converter.

In one embodiment, the cable includes: a power line, which is configured to operably receive the DC power, so as to generate the bus power; and a communication bus coupled between the power delivery unit and the charging circuit, wherein the communication bus is configured to operably transmit a signal related to the DC power, a signal related to the bus power and/or a signal related to the charging power.

In one embodiment, the charging system further comprises: a tracking control circuit, which is coupled between the power delivery unit and the charging circuit and which is configured to operably generate a communication signal according to the power conversion efficiency, wherein the communication signal is transmitted to the power delivery unit via the communication bus, for adjusting the DC power to track the maximum power conversion efficiency.

In one embodiment, the power delivery unit detects and obtains an input voltage and an input current of the input power by an analog digital conversion (ADC) circuit in the power delivery unit; or, wherein the power delivery unit detects and obtains the input voltage and the input current of the input power according to a DC voltage of the DC power and a look up table.

In one embodiment, the charging circuit includes an inductive switching power converter and/or a capacitive switching power converter.

In one embodiment, the charging circuit includes both the inductive switching power converter and the capacitive switching power converter, and wherein: the inductive switching power converter is configured to operably switch an inductor in the inductive switching power converter, so as to convert the bus power to a first power; and the capacitive switching power converter is configured to operably switch a conversion capacitor in the capacitive switching power converter, so as to convert the first power to the charging power; wherein the inductive switching power converter and the capacitive switching power converter determine to operate in a combination of a regulation mode and a short circuit conduction mode according to a parameter of the input power; wherein in the regulation mode, the inductive switching power converter regulates the first power to a predetermined target, or the capacitive switching power converter regulates the charging power to the predetermined target; wherein in the short circuit conduction mode, the inductive switching power converter short-circuits the bus power to the first power, or the capacitive switching power converter short-circuits the first power to the charging power.

In one embodiment, the inductive switching power converter includes a plurality of first switching devices, which are configured to operably switch a coupling relationship between the inductor and the bus power and a coupling relationship between the inductor and the first power, so as to convert the bus power to the first power; and the capacitive switching power converter includes a plurality of second switching devices, which are configured to operably switch a coupling relationship between the conversion capacitor and the first power and a coupling relationship between the conversion capacitor and the charging power, so as to convert the first power to the charging power; wherein the inductive switching power converter operates in a first regulation mode and a first short circuit conduction mode, wherein in the first regulation mode, the plurality of first switching devices switch the inductor, so as to regulate the first power to a first predetermined target, and wherein in the first short circuit conduction mode, at least one of the plurality of first switching devices is controlled to be conductive, so as to short-circuit the bus power to the first power; wherein the capacitive switching power converter operates in a second regulation mode and a second short circuit conduction mode, wherein in the second regulation mode, the plurality of second switching devices switch the conversion capacitor, so as to regulate the charging power to a second predetermined target, and wherein in the second short circuit conduction mode, at least one of the plurality of second switching devices is controlled to be conductive, so as to short-circuit the first power to the charging power; wherein the charging circuit determines that the inductive switching power converter operates in the first regulation mode or the first short circuit conduction mode and/or determines that the capacitive switching power converter operates in the second regulation mode and the second short circuit conduction mode according to the parameter of the input power.

In one embodiment, when an input voltage of the input power is lower than a first threshold, the inductive switching power converter operates in the first regulation mode, wherein the first threshold is correlated with a charging voltage of the charging power; when the input voltage is lower than a second threshold, the capacitive switching power converter operates in the second short circuit conduction mode, wherein the second threshold is correlated with a product of the charging voltage multiplied by a current magnification ratio, wherein the current magnification ratio is a ratio where a charging current of the charging power to a first current of the first power; when an input current of the input power is constant, the inductive switching power converter operates in the first short circuit conduction mode; when the input current is constant and when the input voltage is variable and exceeds the second threshold, the inductive switching power converter operates in the first short circuit conduction mode and the capacitive switching power converter operates in the second regulation mode.

In one embodiment, the power delivery unit includes an AC-DC power converter or a DC-DC power converter.

In one embodiment, the power delivery unit includes a universal serial bus (USB) power delivery (PD) circuit.

In one embodiment, the capacitive switching power converter is a capacitor voltage divider.

In one embodiment, the inductive switching power converter is a buck switching power converter, and wherein when the DC power is programmable and is lower than the first threshold, an upper gate switch of the plurality of switching devices is fully conductive, so as to short-circuit the DC power and the first power.

The present invention proposes a charging control method capable of tracking maximum efficiency.

The present invention also proposes a charging system capable of tracking maximum efficiency.

Advantages of the present invention include: that the charging system of the present invention can achieve fast charging by maximum charging efficiency with only very little increase of the manufacturing cost.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 2:
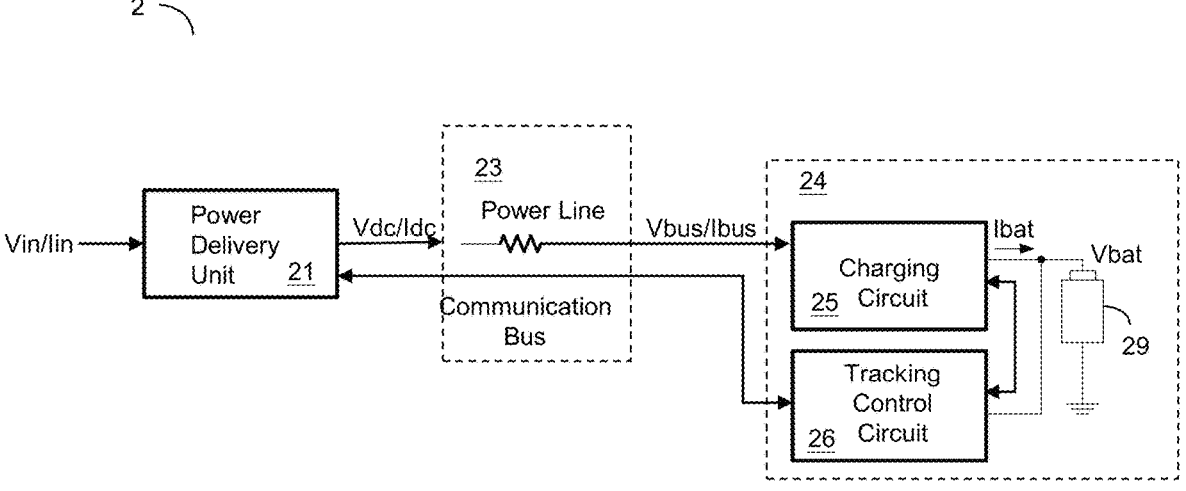
FIG. 2 shows a schematic diagram of a charging system according to an embodiment of the present invention.

Please refer to FIG. 2, which shows a schematic diagram of a charging system 2 according to an embodiment of the present invention. The charging system 2 of the present invention comprises: a power delivery unit 21, a detachable cable 23 and a portable device 24, wherein the portable device 24 includes: a charging circuit 25, a tracking control circuit 26 and a battery 29.

The power delivery unit 21 converts an input power to a DC power, wherein the input power includes an input voltage Vin and an input current Iin, and the DC power includes a DC voltage Vdc and a DC current Idc. In one embodiment, the power delivery unit 21 obtains the input voltage Vin and/or the input current Iin of the input power according to the DC voltage Vdc of the DC power and a look up table. The cable 23 includes a power line and a communication bus. The cable 23 receives the DC power, and generates a bus power. The bus power includes a bus voltage Vbus and a bus current Ibus. The power line receives the DC power, and generates the bus power. The communication bus is coupled between the power delivery unit 21 and the charging circuit 25, and the communication bus is configured to operably transmit a signal related to the DC power (DC power related signal), a signal related to the bus power (bus power related signal) and/or a signal related to a charging power (charging power related signal). The charging circuit 25 in the portable device 24 is configured to operably convert the bus power to the charging power for charging a battery 29 during a charging period, wherein the charging power includes a charging voltage Vbat and a charging current Ibat. In one embodiment, during the charging period, the charging voltage Vbat and/or the charging current Ibat of the charging power is constant.

The portable device 24 further includes the charging circuit 25 and the tracking control circuit 26, in addition to the battery 29. The tracking control circuit 26 is coupled to the power delivery unit 21 and the charging circuit 25. The tracking control circuit 26 is configured to operably generate a communication signal according to the power conversion efficiency, wherein the communication signal is transmitted to the power delivery unit 21 via the communication bus, for adjusting the DC power to track a maximum of the power conversion efficiency ("maximum power conversion efficiency").

The power delivery unit 21 adjusts the DC power, and/or the charging circuit 25 adjusts the charging power, so as to track the maximum power conversion efficiency, wherein the power conversion efficiency includes one of the following: an input power conversion efficiency, which is a conversion efficiency for converting the input power to the charging power; a DC power conversion efficiency, which is a conversion efficiency for converting the DC power to the charging power; or a bus power conversion efficiency, which is a conversion efficiency for converting the bus power to the charging power.

In one embodiment, the input power is for example a direct current (DC) power or an alternating current (AC) power. The power delivery unit 21 is for example an AC-DC power converter or a DC-DC power converter.

In one embodiment, the above-mentioned power delivery unit 21, charging circuit 25 and the tracking control circuit 26 comply with, for example but not limited to, USB Power Delivery Specification, PumpExpress Specification or Quick Charge 3.0 Specification, or any other power bus specification which defines that the power bus has a programmable charging voltage Vbat and/or a programmable charging current Ibat. In one embodiment, the power delivery unit 21 can be for example an adaptor, a power bank or a power supply circuit which complies with anyone of the above-mentioned power bus specifications. In one embodiment, signals are transmitted via a communication interface, such as a communication bus of the cable 23, which complies with anyone of the above-mentioned power bus specifications.

Figure 1:
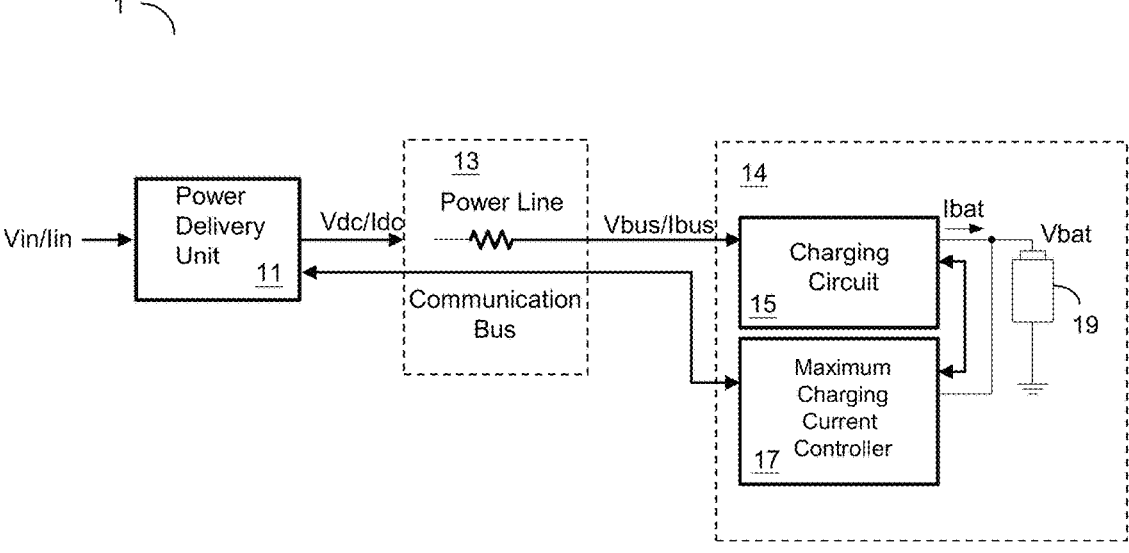
FIG. 1 shows a schematic circuit diagram of a conventional charging system.

In one embodiment, the portable device 24 further includes: a maximum charging current controller 17 (not shown in FIG. 2; please refer to the maximum charging current controller 17 in FIG. 1). During a charging period, when the condition allows, the maximum charging current controller of the portable device 24 can control the charging circuit 25 to charge the battery 29 by a maximum current of the charging current Ibat. And, when charging the battery 29 by the maximum current of the charging current Ibat, the power delivery unit 21 adjusts the DC power, so as to track the maximum power conversion efficiency.

In tracking the maximum power conversion efficiency, the DC power for example can be adaptively adjusted.

Figure 3:
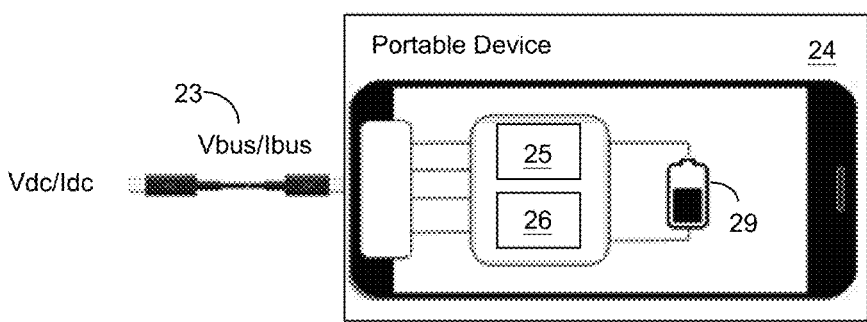
FIG. 3 shows an embodiment of a portable device 24 and a cable 23 in a charging system 2, wherein the portable device 24 is a cell phone and the cable 23 is a USB Type-C cable.

Please refer to FIG. 3, which shows a schematic diagram of a portable device 24 and a cable 23 in a charging system 2, wherein the portable device 24 is a cell phone and the cable 23 is a USB Type-C cable. The charging circuit 25, the tracking control circuit 26 and the battery 29 of this embodiment are similar to the charging circuit 25, the tracking control circuit 26 and the battery 29 of the embodiment shown in FIG. 2, so the details thereof are not redundantly repeated here.

Figure 4:
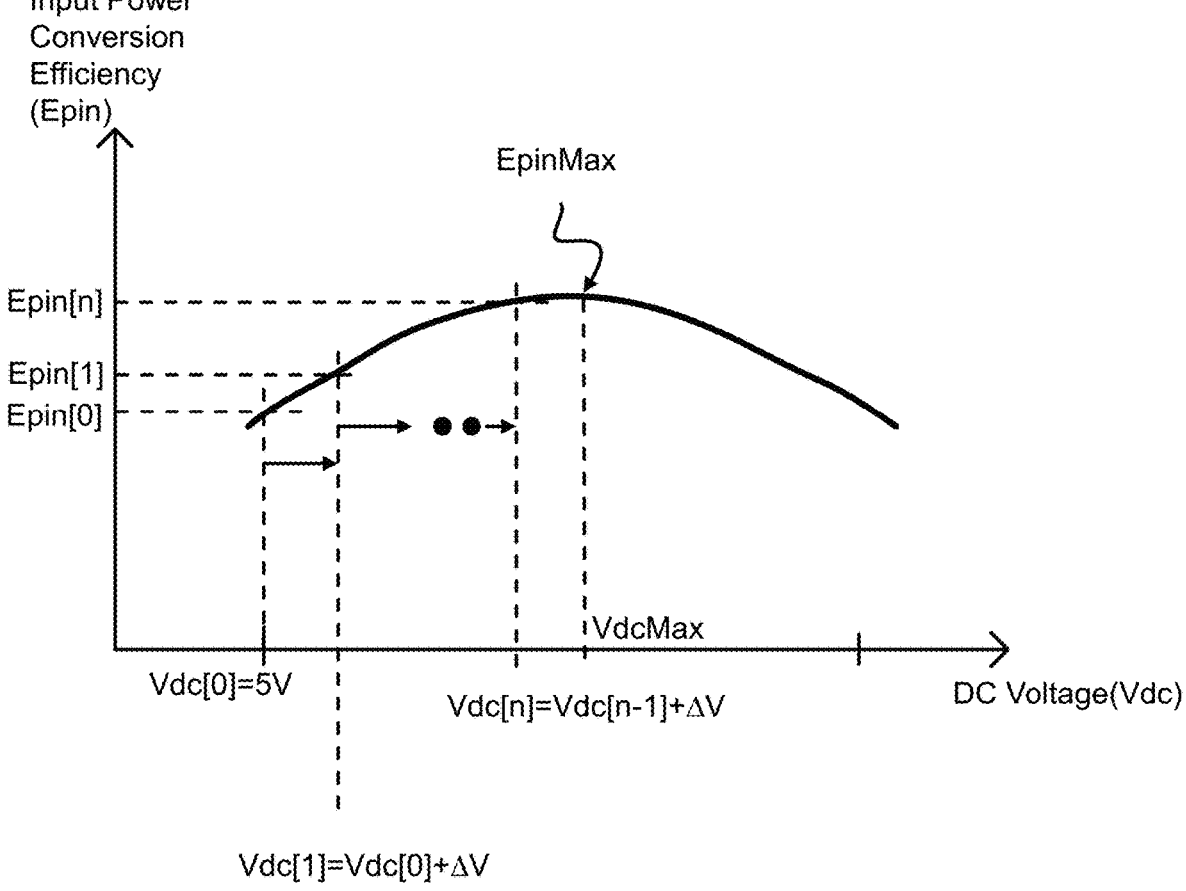
FIG. 4 shows a characteristic curve of a charging system according to an embodiment of the present invention.

Please refer to FIG. 4, which shows a characteristic curve of a charging system according to an embodiment of the present invention. In this embodiment, the initial DC voltage Vdc[0] is 5V. The charging circuit 25 sets the charging voltage Vbat and the charging current Ibat according to the present state of the battery 29 (for example, setting the charging voltage Vbat to be 3.2V and setting the charging current Ibat to be 3 A), and the charging circuit 25 starts charging the battery 29 accordingly; thus, the initial power conversion efficiency Epin[0] of the charging system 2 corresponding to the initial DC voltage Vdc[0] can be obtained. Subsequently, the DC voltage Vdc is increased such that Vdc[1]=Vdc[0]+ΔV, wherein ΔV is for example but not limited to 0.05V. When the DC voltage Vdc changes, because the charging voltage Vbat and/or the charging current Ibat is constant, the DC current Idc will change accordingly. When the DC voltage Vdc changes, the power consumption of the charging system 2 becomes different, so a corresponding input power conversion efficiency Epin[1] can be obtained by the tracking control circuit 26 based upon the DC voltage Vdc[1]. The input power conversion efficiency Epin[1] can be compared with the initial power conversion efficiency Epin[0]; in this case the input power conversion efficiency Epin[1] is greater than the initial power conversion efficiency Epin[0], so it can be determined that when the DC voltage Vdc increases, the input power conversion efficiency Epin increases accordingly. Under such situation, the tracking control circuit 26 can further increase the DC voltage Vdc, for example but not limited to Vdc[n]=Vdc[n−1]+ΔV, so as to achieve a high power conversion efficiency under the same charging voltage Vbat and same charging current Ibat.

Figures 5, 6:
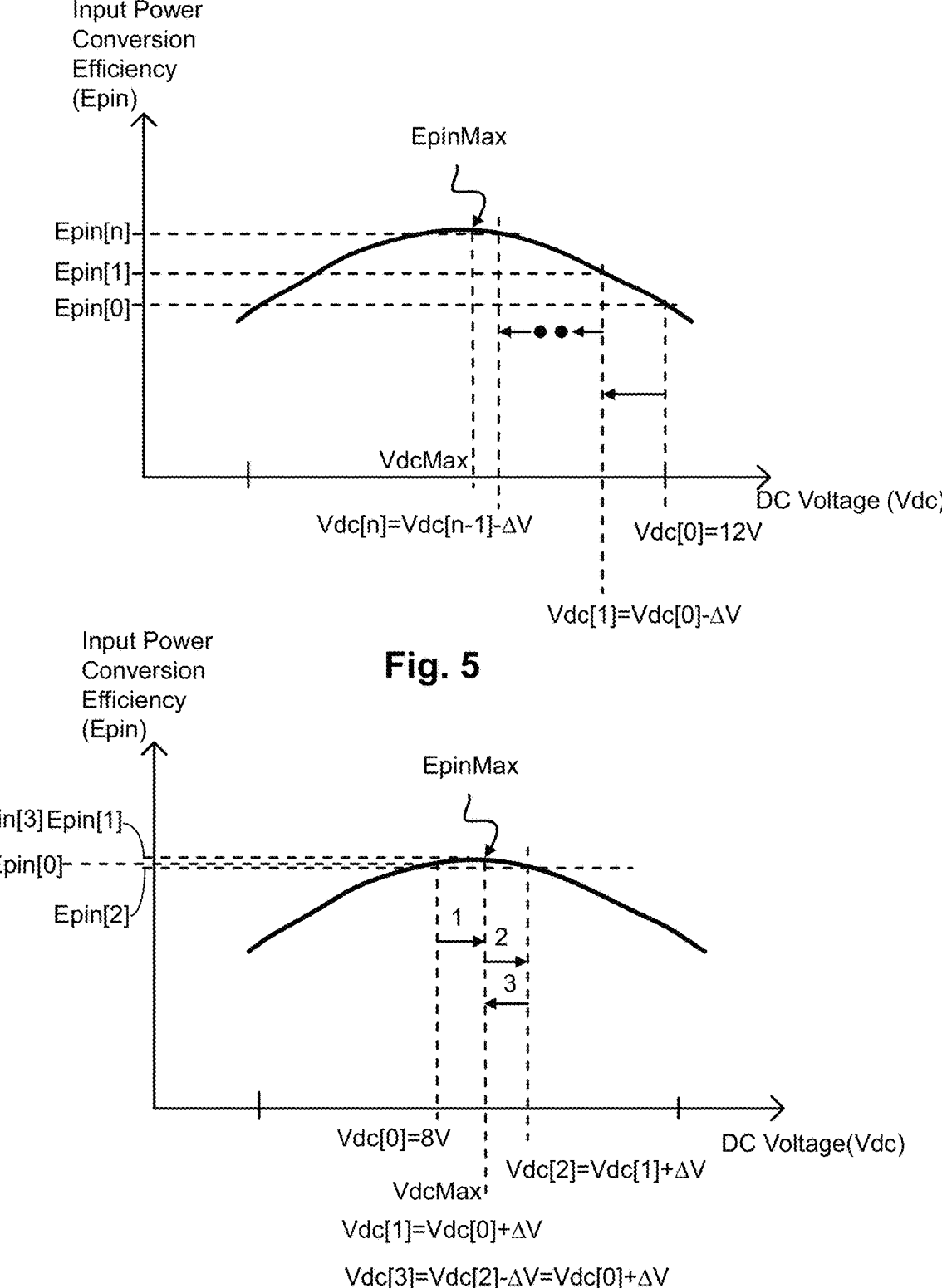
FIG. 5 shows a characteristic curve of a charging system according to an embodiment of the present invention.
FIG. 6 shows a characteristic curve of a charging system according to an embodiment of the present invention.

Please refer to FIG. 5, which shows a characteristic curve of a charging system according to an embodiment of the present invention. In this embodiment, the initial DC voltage Vdc[0] is 12V. The charging circuit 25 sets the charging voltage Vbat and the charging current Ibat according to the present state of the battery 29 (for example, setting the charging voltage Vbat to be 3.2V and setting the charging current Ibat to be 3 A), and the charging circuit 25 starts charging the battery 29 accordingly; thus, the initial power conversion efficiency Epin[0] of the charging system 2 corresponding to the initial DC voltage Vdc[0] can be obtained. Subsequently, the DC voltage Vdc is decreased such that Vdc[1]=Vdc[0]−ΔV, wherein ΔV is for example but not limited to 0.05V. When the DC voltage Vdc changes, because the charging voltage Vbat and/or the charging current Ibat is constant, the DC current Idc will change accordingly. When the DC voltage Vdc changes, the power consumption of the charging system 2 becomes different, so a corresponding input power conversion efficiency Epin[1] can be obtained by the tracking control circuit 26 based upon the DC voltage Vdc[1]. The input power conversion efficiency Epin[1] can be compared with the initial power conversion efficiency Epin[0]; in this case the input power conversion efficiency Epin[1] is greater than the initial power conversion efficiency Epin[0], so it can be determined that when the DC voltage Vdc decreases, the input power conversion efficiency Epin increases accordingly. Under such situation, the tracking control circuit 26 can further decrease the DC voltage Vdc, for example but not limited to Vdc[n]=Vdc[n−1]−ΔV, so as to achieve a high power conversion efficiency under the same charging voltage Vbat and same charging current Ibat.

Please refer to FIG. 6, which shows a characteristic curve of a charging system according to an embodiment of the present invention. In this embodiment, the initial DC voltage Vdc[0] is 8V. The charging circuit 25 sets the charging voltage Vbat and the charging current Ibat according to the present state of the battery 29 (for example, setting the charging voltage Vbat to be 3.2V and setting the charging current Ibat to be 3 A), and the charging circuit 25 starts charging the battery 29 accordingly; thus, the initial power conversion efficiency Epin[0] of the charging system 2 corresponding to the initial DC voltage Vdc[0] can be obtained. Subsequently, the DC voltage Vdc is increased such that Vdc[1]=Vdc[0]+ΔV, wherein ΔV is for example but not limited to 0.05V. When the DC voltage Vdc changes, because the charging voltage Vbat and/or the charging current Ibat is constant, the DC current Idc will change accordingly. When the DC voltage Vdc changes, the power consumption of the charging system 2 becomes different, so a corresponding input power conversion efficiency Epin[1] can be obtained by the tracking control circuit 26 based upon the DC voltage Vdc[1]. The input power conversion efficiency Epin[1] can be compared with the initial power conversion efficiency Epin[0]; in this case the input power conversion efficiency Epin[1] is greater than the initial power conversion efficiency Epin[0], so it can be determined that when the DC voltage Vdc increases, the input power conversion efficiency Epin increases accordingly. Under such situation, the tracking control circuit 26 can further increase a level of the DC voltage Vdc such that for example but not limited to Vdc[2]=Vdc[1]+ΔV, so that this embodiment can achieve a much higher power conversion efficiency through adopting same charging voltage Vbat and same charging current Ibat. However, as shown in FIG. 6, after an input power conversion efficiency Epin[2] corresponding to the DC voltage Vdc[2] is obtained, it is found that Epin[2] is smaller than Epin[1], that is, the input power conversion efficiency Epin becomes smaller, as compared to the previous input power conversion efficiency Epin. Under such situation, the DC voltage Vdc should be decreased, so as to achieve a maximum power conversion efficiency EpinMax. Under such situation, the tracking control circuit 26 sets the DC voltage Vdc as: Vdc[3]=Vdc[2]−ΔV=(Vdc[1]+ΔV)−ΔV=Vdc[1]=Vdc[0]+ΔV. As shown in FIG. 6, the maximum power conversion efficiency EpinMax can be achieved by repeatedly and dynamically adjusting the DC voltage Vdc.

Figure 7:
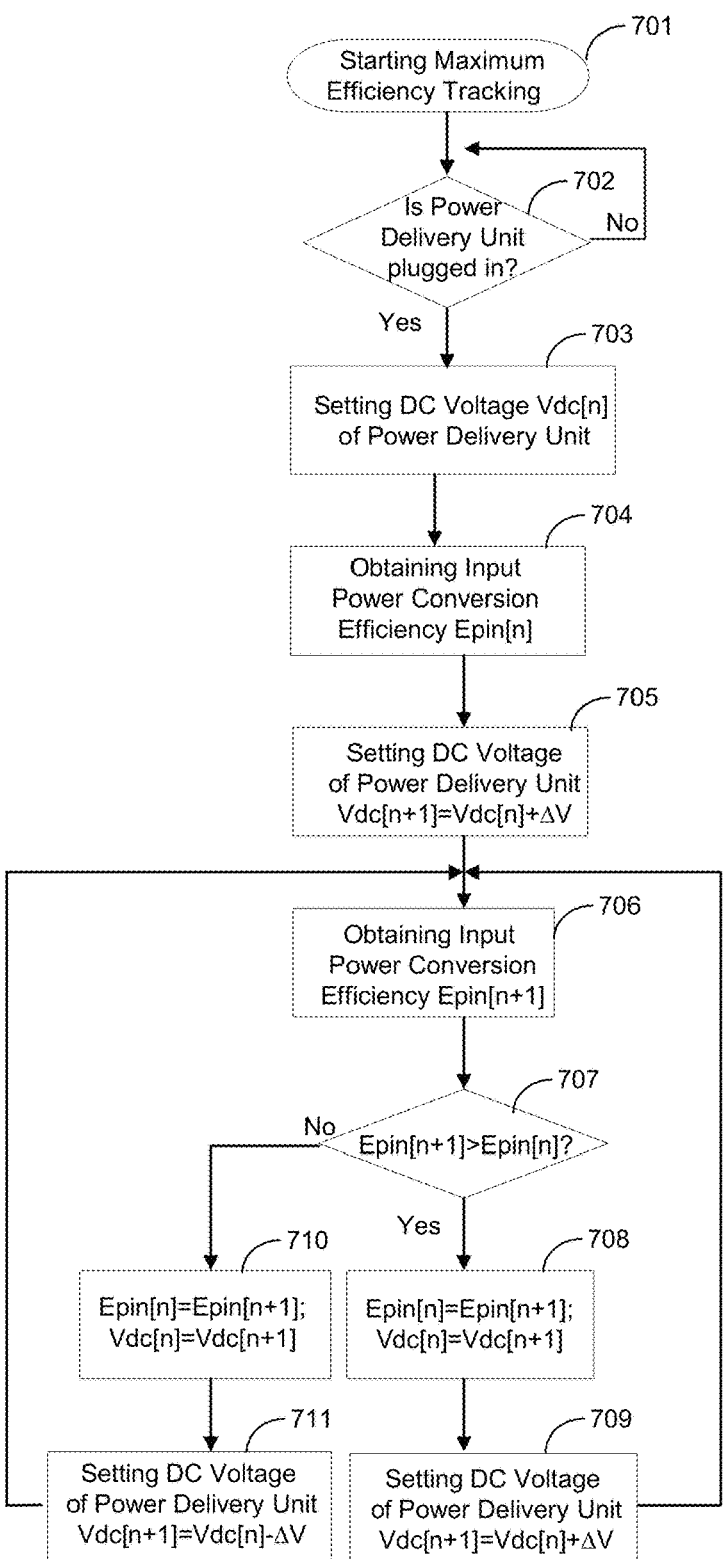
FIG. 7 shows a flowchart diagram of a method capable of tracking maximum power conversion efficiency according to an embodiment of the present invention.

Please refer to FIG. 7, which shows a flowchart diagram of a method capable of tracking maximum power conversion efficiency according to an embodiment of the present invention. First, in step 701, the maximum efficiency tracking method starts. Subsequently in step 702, it is determined whether a power delivery unit is plugged into a portable device via a cable. If it is determined yes, proceed to step 703. If it is determined no, return back to the step before step 702, and execute the step 702 again. In step 703, the DC Voltage of the power delivery unit is set as Vdc[n]. Subsequently in step 704, an input power conversion efficiency Epin[n] is obtained according to the DC Voltage Vdc[n]. Subsequently in step 705, the DC Voltage of the power delivery unit is set as Vdc[n+1]=Vdc[n]+ΔV. Subsequently in step 706, an input power conversion efficiency Epin[n+1] is obtained according to the DC Voltage Vdc[n+1]. Subsequently in step 707, the input power conversion efficiency Epin[n+1] is compared with the input power conversion efficiency Epin[n] to determine whether Epin[n+1]>Epin[n]. If it is determined yes, proceed to step 708. If it is determined no, proceed to step 710. In step 708, the input power conversion efficiency and the DC Voltage of the power delivery unit are set as Epin[n]=Epin[n+1] and Vdc[n]=Vdc[n+1]. Subsequently in step 709, the DC Voltage of the power delivery unit is set as Vdc[n+1]=Vdc[n]−ΔV. Subsequently, return back to the step before step 706 and execute the step 706 again. In step 710, the input power conversion efficiency and the DC Voltage of the power delivery unit are set as Epin[n]=Epin[n+1] and Vdc[n]=Vdc[n+1]. Subsequently in step 711, the DC Voltage of the power delivery unit is set as Vdc[n+1]=Vdc[n]−ΔV. Subsequently, return back to the step before step 706, and execute the step 706 again.

Figure 8:
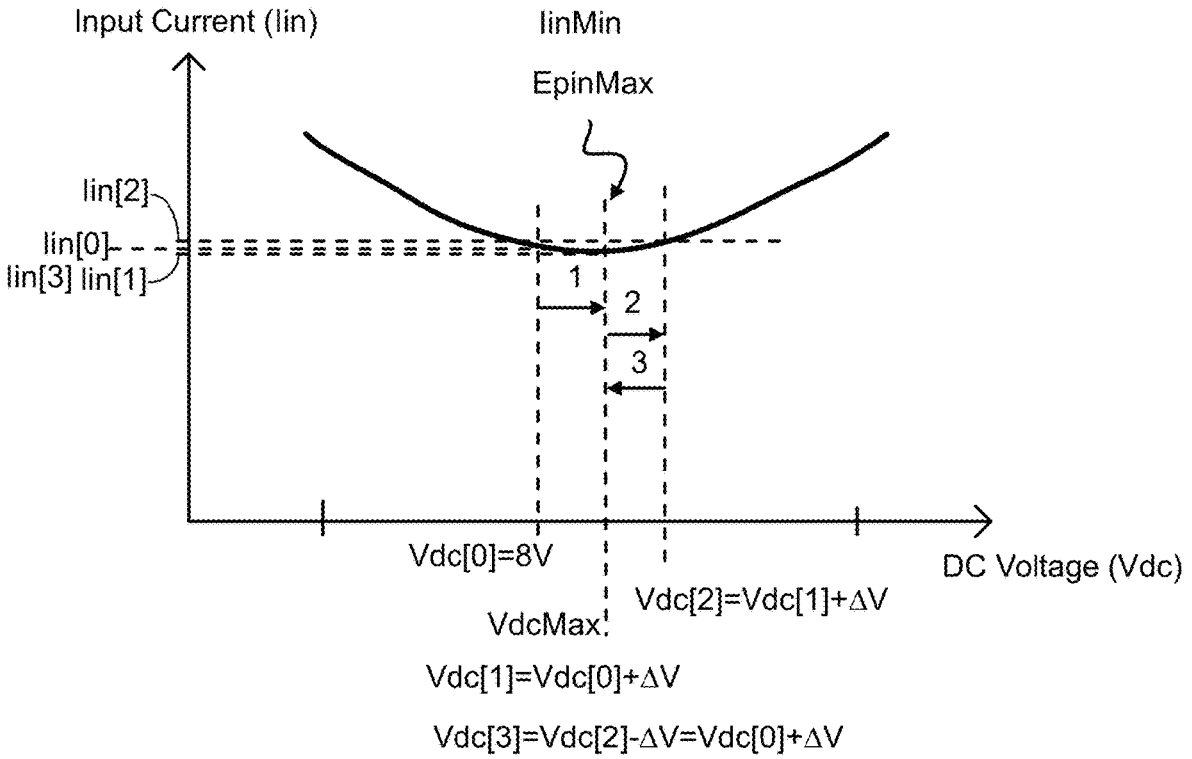
FIG. 8 shows a characteristic curve of a charging system according to another embodiment of the present invention.

Please refer to FIG. 8, which shows a characteristic curve of a charging system according to another embodiment of the present invention. In this embodiment, the input voltage Vin is constant. When the power conversion efficiency includes the input power conversion efficiency Epin, the power delivery unit 21 adjusts the DC power to track a minimum IinMin of an input current Iin, so as to track a maximum EpinMax of the input power conversion efficiency Epin. As shown in FIG. 8, because the input current Iin is inversely proportional to the input power conversion efficiency Epin, this embodiment can track the minimum IinMin of the input current Iin to track the maximum EpinMax of the input power conversion efficiency Epin by adjusting the DC voltage Vdc. In this embodiment, the initial DC voltage Vdc[0] is 8V. The charging circuit 25 sets the charging voltage Vbat and the charging current Ibat according to the present state of the battery 29 (for example, setting the charging voltage Vbat to be 3.2V and setting the charging current Ibat to be 3 A), and the charging circuit 25 starts charging the battery 29 accordingly; thus, the initial input current Iin[0] corresponding to the initial DC voltage Vdc[0] can be obtained. Subsequently, the DC voltage Vdc is increased such that Vdc[1]=Vdc[0]+ΔV, wherein ΔV is for example but not limited to 0.05V. When the DC voltage Vdc changes, because the charging voltage Vbat and/or the charging current Ibat is constant, the DC current Idc will change accordingly. When the DC voltage Vdc changes, a corresponding input current Iin[1] can be obtained based upon the DC voltage Vdc[1] by the tracking control circuit 26. Subsequently, the input current Iin[1] is compared with the input current Iin[0]. Because the input current Iin[1] is smaller than the input current Iin[0], it can be determined that when the DC voltage Vdc increases, the input current Iin decreases. Under such situation, the tracking control circuit 26 can further increase the DC voltage Vdc such that for example but not limited to Vdc[2]=Vdc[1]+ΔV, to achieve an even higher power conversion efficiency under the same charging voltage Vbat and charging current Ibat. However, as shown in FIG. 8, after a input current Iin[2] corresponding to the DC voltage Vdc[2] is obtained, it is found that Iin[2]

is greater than Iin[1], that is, the input current Iin becomes greater, as compared to the previous input current Iin. Under such situation, the DC voltage Vdc should be decreased, so as to achieve a minimum input current. Under such situation, the tracking control circuit 26 sets the DC voltage Vdc as: Vdc[3]=Vdc[2]−ΔV=(Vdc[1]+ΔV)−ΔV=Vdc[1]=Vdc[0]+ΔV. As shown in FIG. 8, the minimum input current IinMin can be achieved by repeatedly and dynamically adjusting the DC voltage Vdc, to achieve the maximum power conversion efficiency EpinMax.

Figure 9:
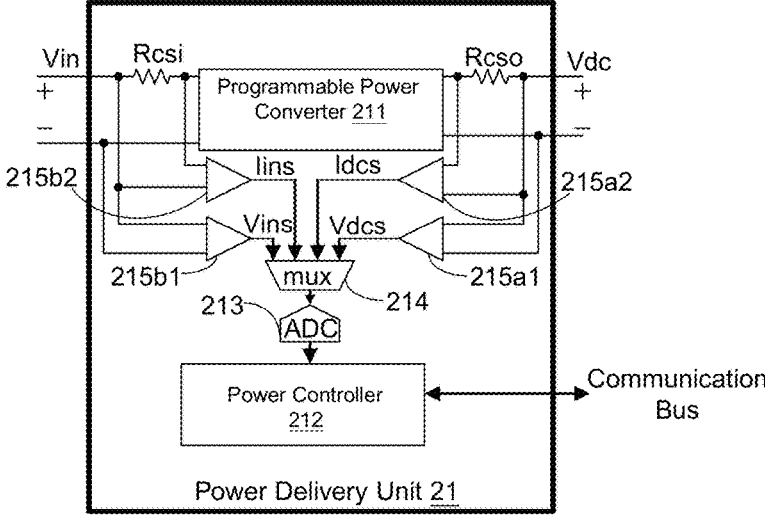
FIG. 9 shows a power delivery unit of a charging system according to an embodiment of the present invention.

Please refer to FIG. 9, which shows a power delivery unit of a charging system according to an embodiment of the present invention. In this embodiment, the power delivery unit 21 includes: a programmable power converter 211, a power controller 212, an analog-to-digital converter (ADC) circuit 213, a multiplexer (mux) 214 and amplifiers 215a1, 215a2, 215b1 and 215b2. A positive end of the input voltage Vin is coupled to the programmable power converter 211 via a resistor Rcsi. A positive end of the DC voltage Vdc is coupled to the programmable power converter 211 via a resistor Rcso. Two input ends of the amplifier 215b2 are coupled to two ends of the resistor Rcsi, respectively, so that the amplifier 215b2 can generate an input current signal Iins according to a voltage difference between two ends of the resistor Rcsi. Two input ends of the amplifier 215a2 are coupled to two ends of the resistor Rcso, respectively, so that the amplifier 215a2 can generate a DC current signal Idcs according to a voltage difference between two ends of the resistor Rcso. Two input ends of the amplifier 215b1 are coupled to the positive end and negative end of the input voltage Vin, respectively, so that the amplifier 215b1 can generate an input voltage signal Vins according to a voltage difference between the positive end and negative end of the input voltage Vin. Two input ends of the amplifier 215a1 are coupled to the positive end and negative end of the DC voltage Vdc, respectively, so that the amplifier 215a1 can generate a DC voltage signal Vdcs according to a voltage difference between the positive end and negative end of the DC voltage Vdc. Output ends of the amplifiers 215a1, 215a2, 215b1 and 215b2 are coupled to corresponding input ends of the multiplexer (mux) 214. The multiplexer (mux) 214 is coupled to the ADC circuit 213. The ADC circuit 213 is coupled to the power controller 212. The power controller 212 is coupled to a communication bus. In one embodiment, the input voltage Vin can be for example a DC or an AC voltage. The programmable power converter 211 can be for example a DC-DC power converter or an AC-DC power converter. In one embodiment, the power delivery unit 21 detects and obtains the input voltage Vin and/or the input current Iin of the input power by the ADC circuit 213.

Figure 10:
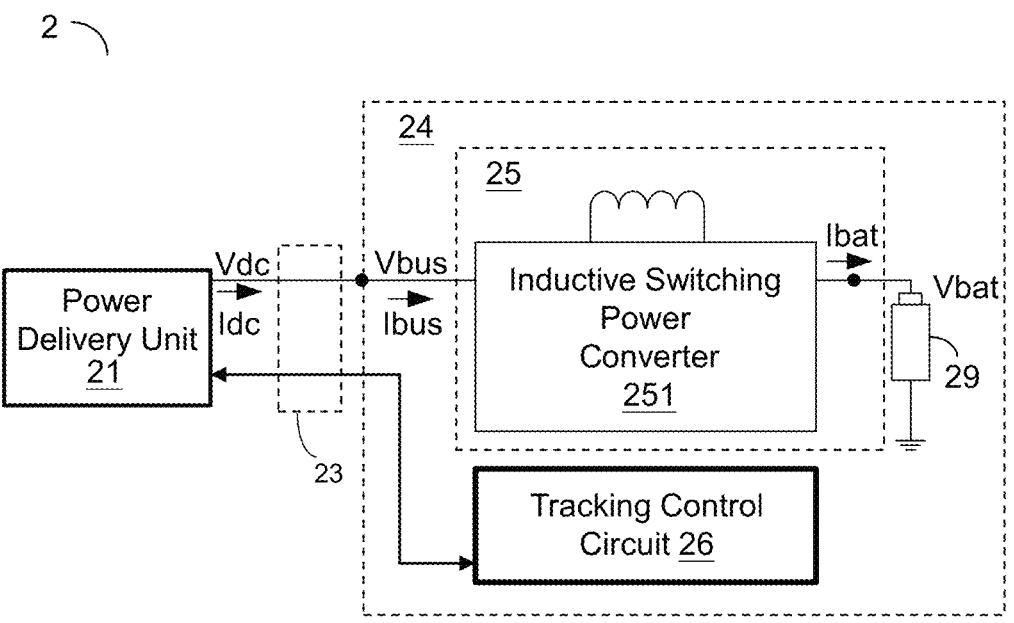
FIG. 10 shows a charging circuit of a charging system according to an embodiment of the present invention.

Please refer to FIG. 10, which shows a charging circuit of a charging system according to an embodiment of the present invention. In this embodiment, the charging circuit 25 of the portable device 24 can be for example an inductive switching power converter 251. The power delivery unit 21, the cable 23, the tracking control circuit 26 and the battery 29 of this embodiment are similar to the power delivery unit 21, the cable 23, the tracking control circuit 26 and the battery 29 of the embodiment shown in FIG. 2, so the details thereof are not redundantly repeated here.

Figure 11:
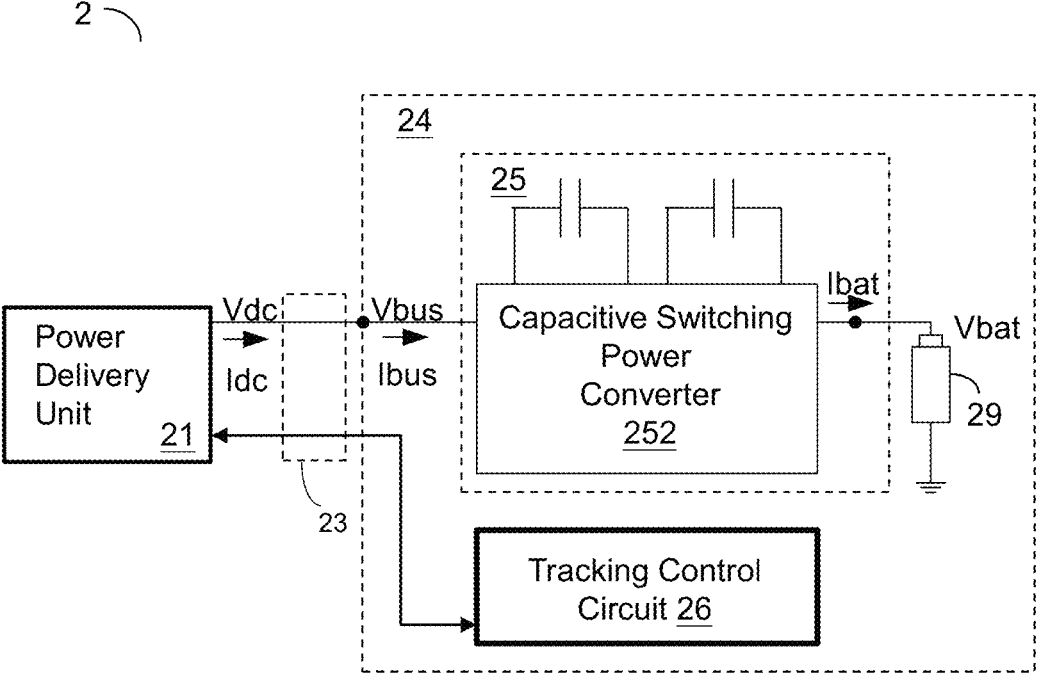
FIG. 11 shows a charging circuit of a charging system according to another embodiment of the present invention.

Please refer to FIG. 11, which shows a charging circuit of a charging system according to another embodiment of the present invention. In this embodiment, the charging circuit 25 of the portable device 24 can be for example a capacitive switching power converter 252. The power delivery unit 21, the cable 23, the tracking control circuit 26 and the battery 29 of this embodiment are similar to the power delivery unit 21, the cable 23, the tracking control circuit 26 and the battery 29 of the embodiment shown in FIG. 2, so the details thereof are not redundantly repeated here.

Figure 12:
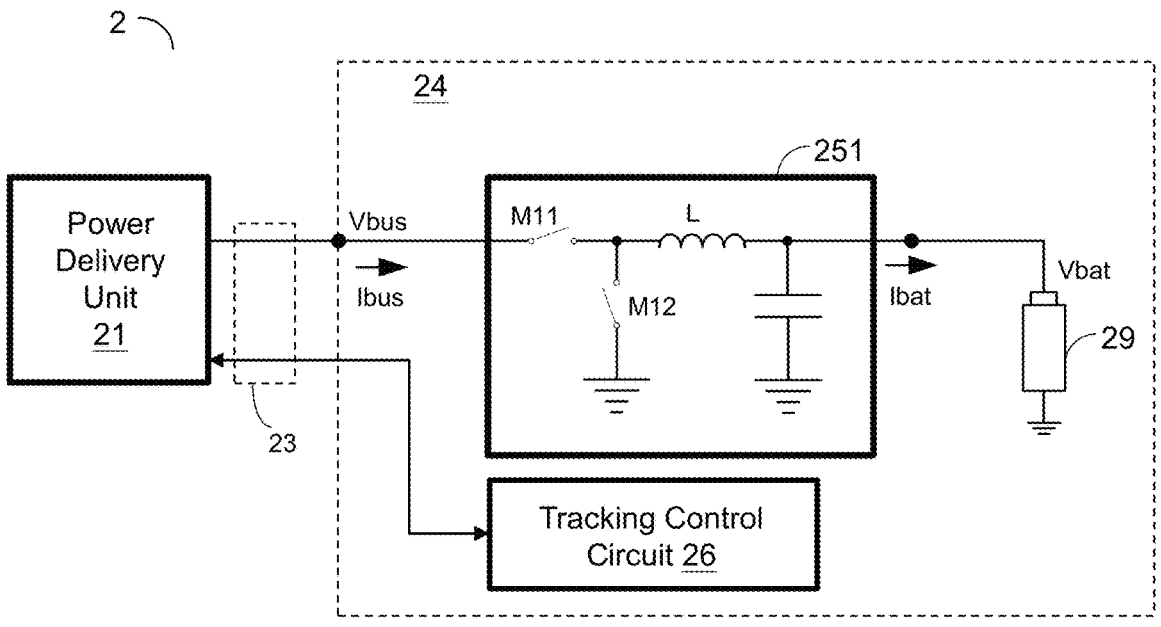
FIG. 12 shows a charging circuit of a charging system according to an embodiment of the present invention.

Please refer to FIG. 12, which shows a charging circuit of a charging system 2 according to an embodiment of the present invention. In one embodiment, the charging circuit 25 of the portable device 24 in the charging system 2 can be for example an inductive switching power converter 251. The inductive switching power converter 251 includes at least one inductor L and switching devices (e.g., M11, M12). The switching devices (e.g., M11, M12) are configured to operably switch a coupling relationship between the inductor L and a bus power (including Vbus and Ibus) and a coupling relationship between the inductor L and a charging power (including Vbat and Ibat), so as to convert the bus power to generate the charging power. The inductive switching power converter 251 can be for example a buck switching power converter.

Figure 13:
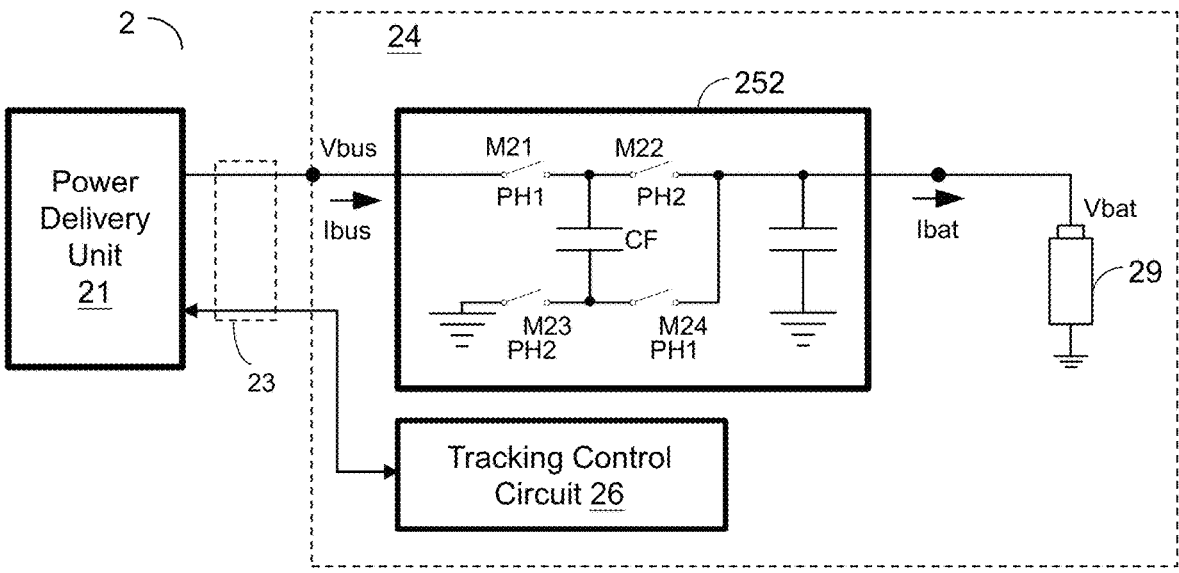
FIG. 13 shows a charging circuit of a charging system according to an embodiment of the present invention.

Please refer to FIG. 13, which shows a charging circuit of a charging system 2 according to an embodiment of the present invention. The charging circuit 25 of the portable device 24 in the charging system 2 can be for example a capacitive switching power converter 252. The capacitive switching power converter 252 includes at least one conversion capacitor CF and switching devices (e.g., M21, M22, M23, M24). The switching devices (e.g., M21, M22, M23, M24) are configured to operably switch a coupling relationship between the conversion capacitor CF and a bus power (including Vbus and Ibus) and a coupling relationship between the conversion capacitor CF and a charging power (including Vbat and Ibat), so as to convert the first power to generate the charging power. In one embodiment, the capacitive switching power converter 252 can be for example a capacitor voltage divider.

Figure 15:
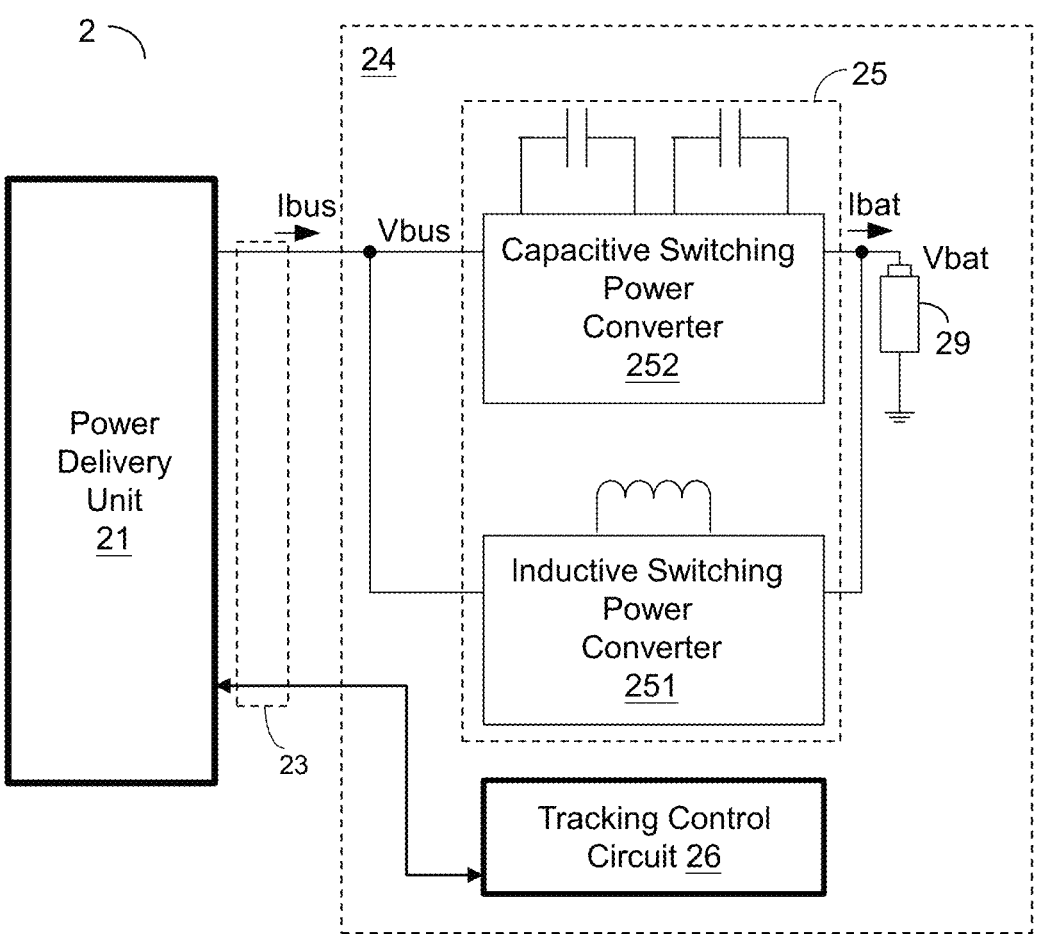
FIG. 15 shows a charging circuit of a charging system according to an embodiment of the present invention.

Please refer to FIG. 15, which shows a charging circuit 25 of a charging system 2 according to an embodiment of the present invention. In one embodiment, the charging circuit 25 of the portable device 24 can be for example an inductive switching power converter 251 coupled in parallel to a capacitive switching power converter 252.

Figure 14:
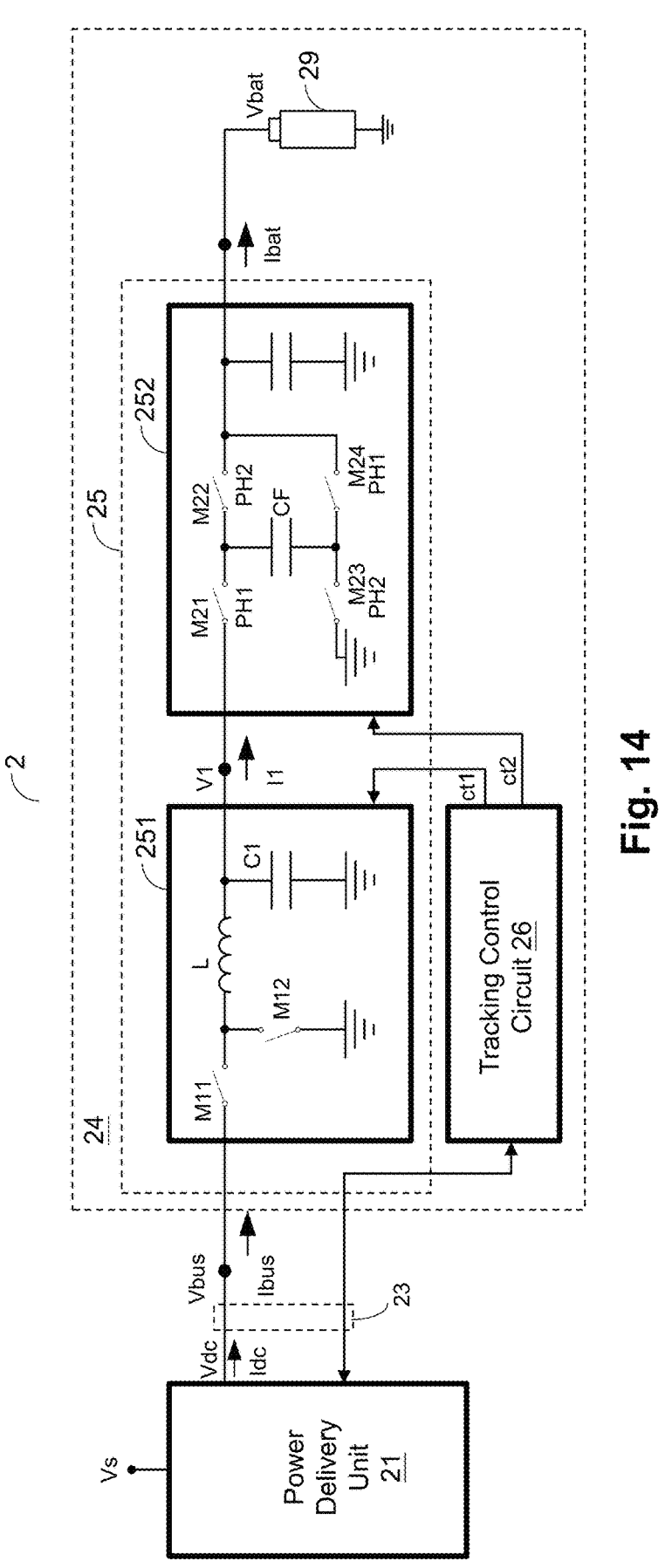
FIG. 14 shows a charging circuit of a charging system according to an embodiment of the present invention.
Figure 16:
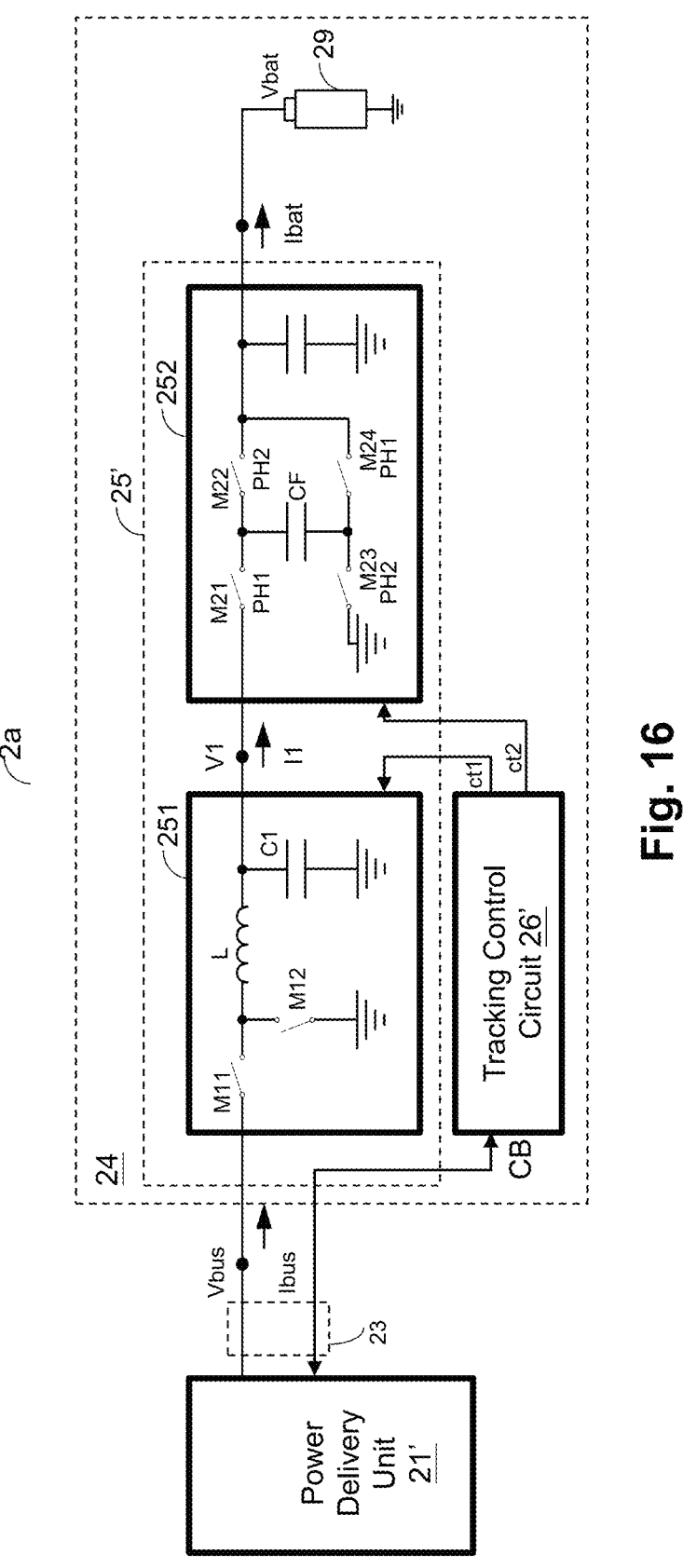
FIG. 16 shows a charging circuit of a charging system according to an embodiment of the present invention.

Please refer to FIG. 14 in conjugation with FIG. 16. FIG. 14 shows a charging circuit 25 of a charging system 2 according to an embodiment of the present invention.

The charging system. 2 comprises: a power delivery unit 21, the charging circuit 25 and a battery 29. In one embodiment, the charging system 2 further comprises: a detachable cable 23. The power delivery unit 21 is configured to operably convert an input power Vs to a DC power (which includes a DC voltage Vdc and a DC current Idc). In one embodiment, the power delivery unit 21 can be for example an AC-DC converter. In this embodiment, the input power Vs can be for example an AC power, wherein the power delivery unit 21 is configured to operably convert the input power Vs to a DC power. In one embodiment, the power delivery unit 21 can be for example an adaptor which complies with a universal serial bus (USB) specification.

Please refer to FIG. 16. FIG. 16 shows a charging circuit 25' of a charging system 2a according to an embodiment of the present invention. In one embodiment, the power delivery unit 21' can be for example an adaptor which complies with a universal serial bus (USB) power delivery (PD) specification. In one embodiment, the charging circuit 25' can request the power delivery unit 21' to provide a bus voltage Vbus and/or a bus current Ibus via a communication interface CB. In one embodiment, the communication interface CB can for example include a D+ signal and a D− signal of a USB protocol or can for example include a CC1 signal and a CC2 signal of a USB PD protocol.

In another embodiment, the charging circuit 25' can obtain or measure a level of a bus voltage Vbus and a level of a bus current Ibus provided by the power delivery unit 21' via a communication interface CB. The above-mentioned communication interface CB can be controlled by the tracking control circuit 26' for communication and control.

Please still refer to FIG. 14. The charging circuit 25 is configured to operably convert the bus power to generate a charging power (which includes a charging voltage Vbat and a charging current Ibat). In one embodiment, the charging circuit 25 comprises: an inductive switching power converter 251, a capacitive switching power converter 252 and a tracking control circuit 26.

The inductive switching power converter 251 includes at least one inductor L and switching devices (e.g., as shown by a upper gate switch M11 and a lower gate switch M12 in FIG. 14). The switching devices (e.g., M11, M12) are configured to operably switch a coupling relationship between the inductor L and the bus power (including Vbus and Ibus) and a coupling relationship between the inductor L and a first power, so as to convert the bus power to generate the first power (including first voltage V1 and first current I1).

In one embodiment, the inductive switching power converter 251 has a first regulation mode and a first short circuit conduction mode. In the first regulation mode, the tracking control circuit 26 generates a control signal ct1 for controlling the switching devices of the inductive switching power converter 251 to regulate the first power to a first predetermined target, for example to regulate the first voltage V1 to a predetermined voltage level or to regulate the first current I1 to a predetermined current level. In the first short circuit conduction mode, the tracking control circuit 26 controls a part of switching devices to be conductive, so as to short-circuit the bus power to the first power.

Please still refer to FIG. 14. The capacitive switching power converter 252 includes at least one conversion capacitor CF and switching devices. The switching devices (e.g., as shown by switching devices M21, M22, M23, M24 in FIG. 14) are configured to operably switch a coupling relationship between the conversion capacitor CF and the first power and a coupling relationship between the conversion capacitor CF and the charging power, so as to convert the first power to generate the charging power.

In one embodiment, the capacitive switching power converter 252 has a second regulation mode and a second short circuit conduction mode. In the second regulation mode, the tracking control circuit 26 generates a control signal ct2 for controlling a switching of the switching devices of the capacitive switching power converter 252, so as to regulate the charging power to a second predetermined target, for example to regulate the charging voltage Vbat to a predetermined voltage level or to regulate the charging current Ibat to a predetermined current level. In the second short circuit conduction mode, the capacitive switching power converter 252 controls a part of switching devices to be conductive, so as to short-circuit the charging power to the first power.

Please still refer to FIG. 14. In one embodiment, the capacitive switching power converter 252 can be a capacitor voltage divider. That is, the charging voltage Vbat of the charging power is 1/k-fold of the first voltage V1 of the first power and the charging current Ibat of the charging current is k-fold of the first current I1 of the first power, wherein k is a current magnification ratio. In the embodiment where the capacitive switching power converter 252 is implemented as a capacitor voltage divider, k is a real number greater than one. To be more specific, in one embodiment, as shown by the configuration in FIG. 14, the current magnification ratio k can be 2. That is, under such situation, the charging voltage Vbat of the charging power is ½-fold of the first voltage V1 of the first power and the charging current Ibat of the charging power is 2-fold of the first current I1 of the first power. In another embodiment which also employs the configuration in FIG. 14, the current magnification ratio k can be 4, that is, the charging voltage Vbat of the charging power is ¼-fold of the first voltage V1 of the first power and the charging current Ibat of the charging power is 4-fold of the first current I1 of the first power.

To elaborate in more detail, in this embodiment, the tracking control circuit 26 controls the switching devices M21, M22, M23, M24 of the capacitive switching power converter 252, so that a first end of the conversion capacitor CF is periodically switched between the first voltage V1 and the charging voltage Vbat during a first charging conversion interval (e.g., PH1) and during a second charging conversion interval (e.g., PH2), and so that a second end of the conversion capacitor CF is periodically switched between the charging voltage Vbat and a ground level during the first charging conversion interval (e.g., PH1) and during the second charging conversion interval (e.g., PH2), thereby generating the charging voltage Vbat which is ½-fold of the first voltage V1 and the charging current Ibat which is 2-fold of the first current I1.

It is worthwhile mentioning that, in one embodiment, in the first short circuit conduction mode, the part of the switching devices which are conductive to achieve the short-circuit conduction are the same switching devices which are employed to switch the inductor L for power conversion in the first regulation mode. From one perspective, in the first regulation mode, the part of the switching devices which are conductive to achieve the short-circuit conduction are employed to turn ON and turn OFF the inductor L for at least one interval within each switching period. That is, the part of the switching devices which are conductive to achieve the short-circuit conduction are not dedicated switching devices only for use in short circuit conduction, and these switching devices also play a role in periodically switching the inductor L in the first regulation mode.

On the other hand, in one embodiment, in the second short circuit conduction mode, the part of the switching devices which are conductive to achieve the short-circuit conduction are the same switching devices which are employed to switch the conversion capacitor CF for power conversion in the second regulation mode. From one perspective, in the second regulation mode, the part of the switching devices which are conductive to achieve the short-circuit conduction are employed to turn ON and turn OFF the capacitor CF for at least one interval within each switching period. That is, the part of the switching devices which are conductive to achieve the short-circuit conduction are not dedicated switching devices only for use in short circuit conduction.

Please still refer to FIG. 14. In one embodiment, the tracking control circuit 26 determines that the inductive switching power converter 251 operates in the first regulation mode or the first short circuit conduction mode and/or determines that the capacitive switching power converter 252 operates in the second regulation mode and the second short circuit conduction mode based upon at least one parameter of the bus power and at least one parameter of the charging power. In one embodiment, the at least one parameter of the bus power can be, for example but not limited to, at least one of a bus voltage Vbus and a bus current Ibus, whereas, the at least one parameter of the charging power can be, for example but not limited to, at least one of a charging voltage Vbat and a charging current Ibat. In one embodiment, the tracking control circuit 26 determines a combination of the above-mentioned operation modes that the inductive switching power converter 251 and the capacitive switching power converter 252 will operate in accordance to a relationship between the above-mentioned parameters and a threshold. Or, alternatively, in another embodiment, the tracking control circuit 26 determines a combination of the above-mentioned operation modes that the inductive switching power converter 251 and the capacitive switching power converter 252 will operate in accordance to for example but not limited to a relationship between at least two of the bus voltage Vbus, the bus current Ibus, the charging voltage Vbat and the charging current Ibat in magnitude or ratio. More specific details will be described later with reference to other embodiments.

Figure 17A:
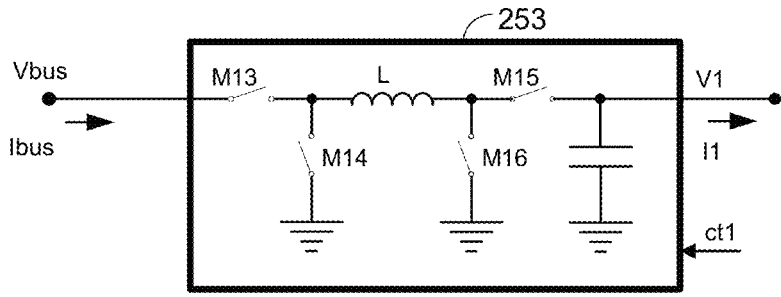
FIG. 17A and FIG. 17B each shows a charging circuit of a charging system according to an embodiment of the present invention.
Figure 17B:
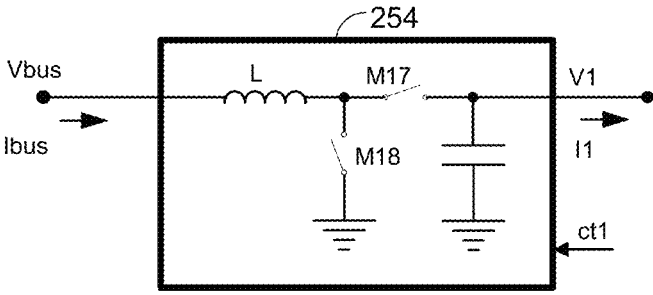

Please still refer to FIG. 14. In one embodiment, the inductive switching power converter can be a buck switching power converter (corresponding to 251), or the inductive switching power converter can be a buck-boost switching power converter (corresponding to 253) as shown in FIG. 17A, or the inductive switching power converter can be a boost switching power converter (corresponding to 254) as shown in FIG. 17B. The inductive switching power converter can be implemented as any type of inductive switching power converter, as long as such inductive switching power converter has such property that, by operating at least a part of its switching devices, its input can be short-circuited to its output (i.e., to short-circuit the bus power to the first power in the foregoing embodiments); such inductive switching power converter can be applied in the present invention.

Please still refer to FIG. 14. In one specific embodiment, in the first short circuit conduction mode, the tracking control circuit 26 controls the upper gate switch M11 to be always ON. In one embodiment, in the first short circuit conduction mode, the tracking control circuit 26 controls the lower gate switch M12 to be always OFF. In another embodiment, the lower gate switching device can be for example a diode. Note that, in the first short circuit conduction mode, a short circuit conduction path between the bus power and the first power includes the upper gate switch M11 which is always ON and the inductor L.

Please still refer to FIG. 17A. In this embodiment, in the first short circuit conduction mode, an input upper gate switch M13 and an output upper gate switch M15 are controlled to be always ON, whereas, an input lower gate switch M14 and an output lower gate switch M16 are controlled to be always OFF.

Please refer to FIG. 17B. In this embodiment, in the first short circuit conduction mode, an upper gate switch M17 is controlled to be always ON, whereas, a lower gate switch M18 is controlled to be always OFF.

On the other hand, please refer back to FIG. 14. In one specific embodiment, in the second short circuit conduction mode, the tracking control circuit 26 controls the switching devices M21 and M22 to be always ON and controls the switching devices M24 to be always OFF. In one embodiment, in the second short circuit conduction mode, the switching devices M23 can be always OFF or can be always ON.

It is worthwhile mentioning that, the following embodiments will explain other details by adopting the buck type inductive switching power converter and the capacitor voltage divider in the embodiment of FIG. 14 as examples; however, the use of these types of inductive switching power converter and capacitive power converter is only an illustrative example, but not for limiting the broadest scope of the present invention.

Figure 18:
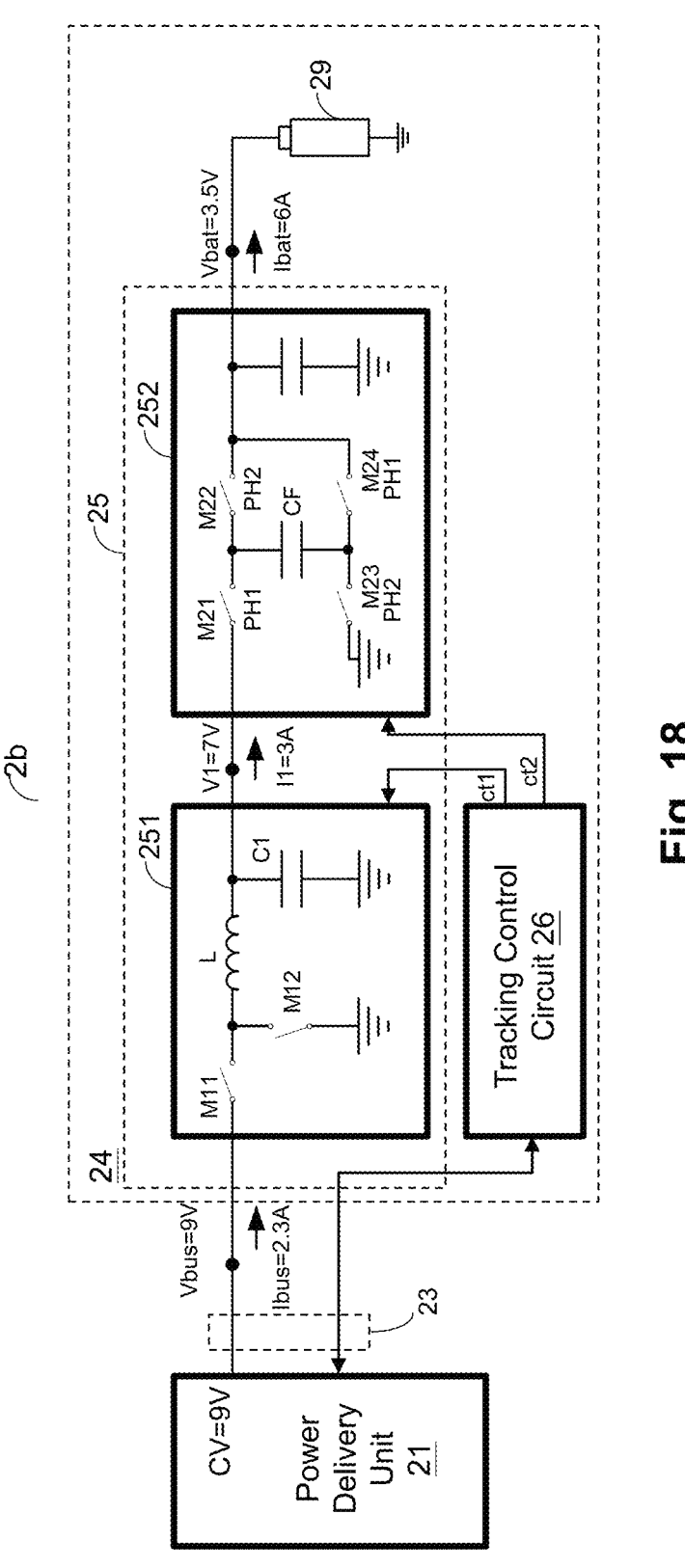
FIG. 18 shows a charging circuit of a charging system according to an embodiment of the present invention.

Please refer to FIG. 18, which shows a charging circuit 25 of a charging system 2b according to an embodiment of the present invention. This embodiment shown in FIG. 18 is based upon the embodiment shown in FIG. 14. In this embodiment, the bus voltage Vbus delivered by the power delivery unit 21 is for example 9V and the bus current Ibus delivered by the power delivery unit 21 is for example 2.3 A. In other words, in this embodiment, the maximum power outputted by the power delivery unit 21 is approximately equal to 21 W. Besides, in this embodiment, the charging voltage Vbat is for example 3.5V. And, this embodiment can supply the charging current Ibat by a constant current mode to charge the battery 29. Besides, if the capacitive switching power converter 252 is controlled to operate in the second regulation mode, in a condition where the above-mentioned current magnification ratio k is 2, the first voltage V1 will be 7V (which is 2-fold of the charging voltage Vbat). Under such circumstance, because the difference between the bus voltage Vbus and the first voltage V1 still remains greater than zero, the criteria for the capacitive switching power converter 252 to be able to operate in the second regulation mode is fulfilled. In one embodiment, the tracking control circuit 26 can determine that the inductive switching power converter 251 operates in the first regulation mode and the capacitive switching power converter 252 operates in the second regulation mode. Under such circumstance, this embodiment can charge the battery 29 by a maximum power. To elaborate in more detail, in this embodiment, in the first regulation mode, the bus voltage Vbus is 9V; the bus current Ibus is 2.3 A; the first voltage V1 is 7V; and the first current V1 is 3 A. And, in this embodiment, in the second regulation mode, the bus voltage Vbus is 3.5V, and the bus current Ibus is 6 A.

Figure 19:
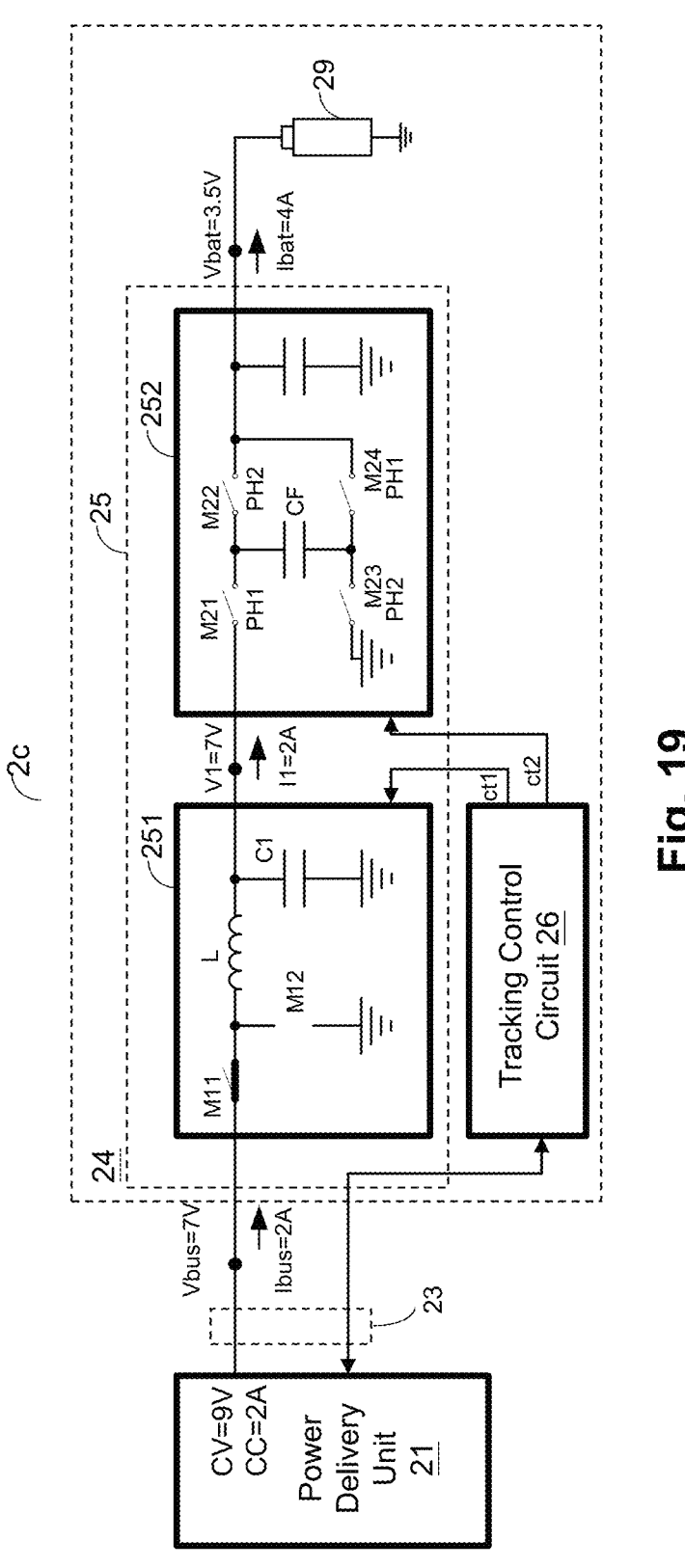
FIG. 19 shows a charging circuit of a charging system according to an embodiment of the present invention.

Please refer to FIG. 19, which shows a charging circuit 25 of a charging system 2c according to an embodiment of the present invention. This embodiment shown in FIG. 19 is based upon the embodiment shown in FIG. 14. In this embodiment, the bus voltage Vbus delivered by the power delivery unit 21 is for example 9V and the bus current Ibus delivered by the power delivery unit 21 is for example 2 A. In other words, in this embodiment, the maximum power outputted by the power delivery unit 21 is approximately equal to 18 W. Besides, in this embodiment, the charging voltage Vbat is for example 3.5V. And, this embodiment can supply the charging current Ibat to charge the battery 29 by a constant current mode. Besides, if the capacitive switching power converter 252 is controlled to operate in the second regulation mode, in a condition where the above-mentioned current magnification ratio k is 2, the first voltage V1 will be 7V (which is 2-fold of the charging voltage Vbat). Under such circumstance, because the difference between highest voltage level (9V) that the bus voltage Vbus can provide and the first voltage V1 (7V) still remains greater than zero, the criteria for the capacitive switching power converter 252 to operate in the second regulation mode is fulfilled.

In one embodiment, as shown in FIG. 19, the tracking control circuit 26 can determine that the inductive switching power converter 251 operates in the first short circuit conduction mode (the thick solid line indicates that M11 is always ON, whereas, the blank indicates that M12 is always OFF) and the capacitive switching power converter 252 operates in the second regulation mode. To elaborate in more detail, in this embodiment, the bus current Ibus which is the maximum constant current that the power delivery unit 21 can provide is 2 A. The inductive switching power converter 251 operates in the first short circuit conduction mode; under such situation, the first current I1 is also 2 A. The capacitive switching power converter 252 operates in the second regulation mode; under such situation, the charging current Ibat is 4 A. And, under such situation, both the bus voltage Vbus and the first voltage V1 are 7V.

It is worthwhile noting that, under such circumstance, because the inductive switching power converter 251 does not execute switching power conversion, the switching loss is reduced. As a result, the charging system 2c can charge the battery 29 by a relatively higher power conversion efficiency. In a case where the power delivery unit 21 is implemented as a mobile device powered by a battery or a power bank, the lifespan of the battery in such power delivery unit 21 can be prolonged. Besides, generally, this arrangement can reduce the operation temperature of the charging circuit 25 in the mobile device.

Besides, in another embodiment, the inductive switching power converter 251 has a maximum duty ratio Dmax. When a relationship between the bus voltage Vbus and the first voltage V1 will cause the inductive switching power converter 251 operating in the first regulation mode to exceed the maximum duty ratio Dmax, the inductive switching power converter 251 can be controlled to operate in the first short circuit conduction mode.

Figure 20:
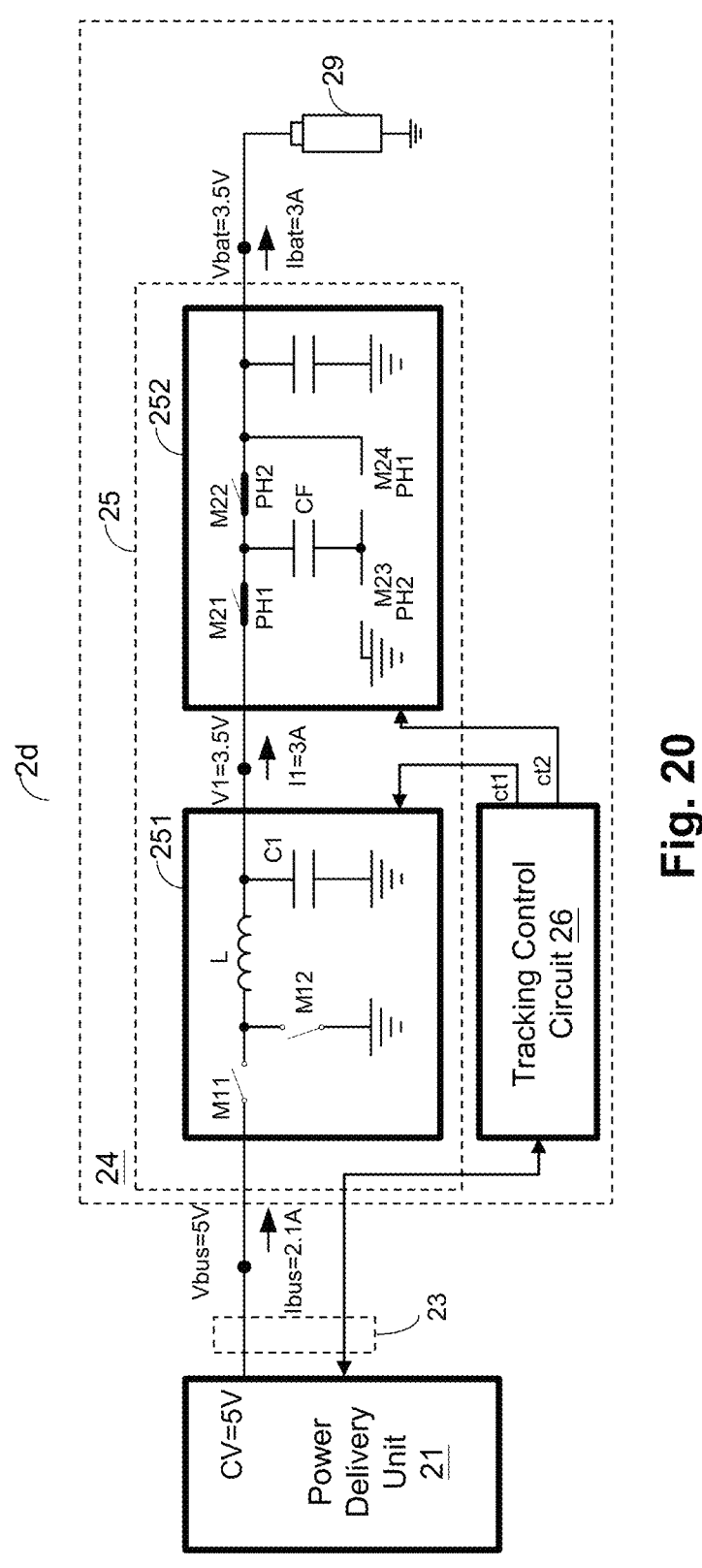
FIG. 20 shows a charging circuit of a charging system according to an embodiment of the present invention.

Please refer to FIG. 20, which shows a charging circuit 25 of a charging system 2d according to an embodiment of the present invention. This embodiment shown in FIG. 20 is based upon the embodiment shown in FIG. 14. In this embodiment, the bus voltage Vbus delivered by the power delivery unit 21 is for example 5V and the bus current Ibus delivered by the power delivery unit 21 is for example 2.1 A. In other words, in this embodiment, the maximum power outputted by the power delivery unit 21 is approximately equal to 10.5 W. Besides, in this embodiment, the charging voltage Vbat is for example 3.5V (corresponding to charging voltage Vbat). And, this embodiment can supply the charging current Ibat by a constant current mode to charge the battery 29. Besides, if the capacitive switching power converter 252 is controlled to operate in the second regulation mode, in a condition where the above-mentioned current magnification ratio k is 2, the first voltage V1 will be 7V (which is 2-fold of the charging voltage Vbat). Under such circumstance, because the difference between the highest voltage level (5V) that the bus voltage Vbus can provide and the first voltage V1 (7V) is smaller than zero, the criteria for the capacitive switching power converter 252 to operate in the second regulation mode is not fulfilled.

As a result, in one embodiment, as shown in FIG. 20, the tracking control circuit 26 can control the inductive switching power converter 251 to operate in the first regulation mode and control the capacitive switching power converter 252 to operate in the second short circuit conduction mode (the thick solid lines indicate that M21 and M22 are always ON, whereas, the blanks indicate that M23 and M24 are always OFF), so as to charge the battery 29 by the maximum power. To elaborate in more detail, in this embodiment, the bus voltage Vbus provides a power supply of 5V; the inductive switching power converter 251 operates in the first regulation mode, wherein the first current I1 is regulated to 3 A, and the capacitive switching power converter 252 operates in the second short circuit conduction mode, wherein the first voltage V1 is the same as the charging voltage Vbat, i.e. 3.5V. Under such circumstance, the bus current Ibus is 2.1 A. Thus, this embodiment can charge the battery 29 by the maximum power.

Figure 21:
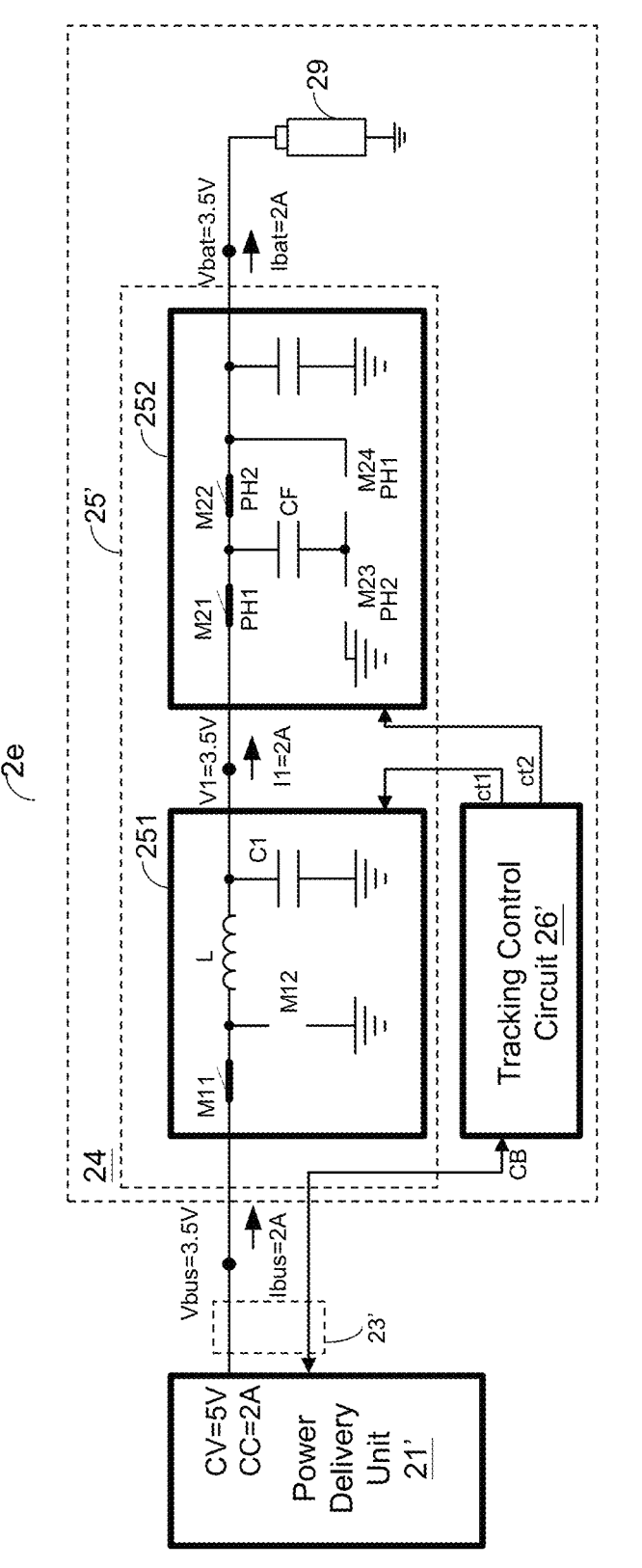
FIG. 21 shows a charging circuit of a charging system according to an embodiment of the present invention.

Please refer to FIG. 21, which shows the charging circuit 25' of the charging system 2e according to an embodiment of the present invention. This embodiment shown in FIG. 21 is based upon the embodiment shown in FIG. 14. In this embodiment, the bus voltage Vbus delivered by the power delivery unit 21 is for example 5V and the bus current Ibus delivered by the power delivery unit 21 is for example 2 A. In other words, in this embodiment, the maximum power outputted by the power delivery unit 21 is approximately equal to 10 W. The voltage condition of this embodiment shown in FIG. 21 is similar to the voltage condition of the embodiment shown in FIG. 20. That is, the criteria for the capacitive switching power converter 252 to operate in the second regulation mode is not fulfilled.

In one embodiment, as shown in FIG. 21, the tracking control circuit 26 can control the inductive switching power converter 251 to operate in the first short circuit conduction mode and control the capacitive switching power converter 252 to operate in the second short circuit conduction mode. The tracking control circuit 26 can request the power delivery unit 21 to output a constant current via the above-mentioned communication interface CB. To elaborate in more detail, in this embodiment, the bus current Ibus of the power delivery unit 21 is regulated to 2 A. In the first short circuit conduction mode and in the second short circuit conduction mode, the first current I1 and the charging current Ibat are both 2 A and the first voltage V1 and the bus voltage Vbus are both 3.5V (i.e., corresponding to the charging voltage Vbat). In other words, the charging system 2e operates in a direct charging mode, which indicates that the power delivery unit 21 directly charges the battery 29 by a constant current.

Figure 22:
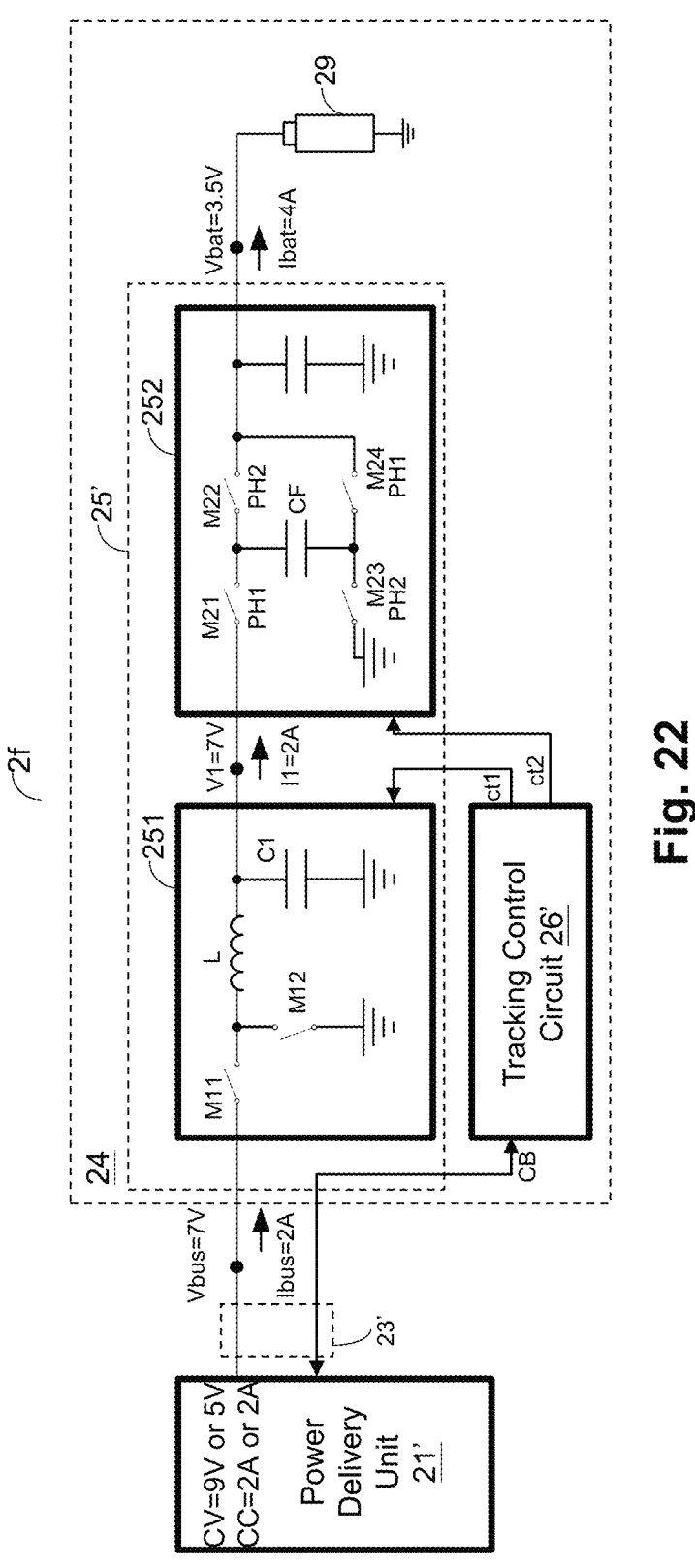
FIG. 22 shows a charging circuit of a charging system according to an embodiment of the present invention.

Please refer to FIG. 22, which shows the charging circuit 25' of the charging system 2f according to an embodiment of the present invention. This embodiment shown in FIG. 22 is based upon the embodiment shown in FIG. 14. This embodiment can operate in a low power mode or a high power mode, wherein in the low power mode, the bus voltage Vbus delivered by the power delivery unit 21 is for example 5V and the bus current Ibus delivered by the power delivery unit 21 is for example 2 A, that is, in this case the maximum power outputted by the power delivery unit 21 is approximately equal to 10 W; and in the high power mode, the bus voltage Vbus delivered by the power delivery unit 21 is for example 9V and the bus current Ibus delivered by the power delivery unit 21 is for example 2 A, that is, in this case the maximum power outputted by the power delivery unit 21 is approximately equal to 18 W. Besides, in this embodiment, the charging voltage Vbat is for example 3.5V (corresponding to charging voltage Vbat). And, this embodiment can supply the charging current Ibat by a constant current mode to charge the battery 29. Besides, if the capacitive switching power converter 252 is controlled to operate in the second regulation mode, in the condition where the above-mentioned current magnification ratio k is 2, the first voltage V1 will be 7V (which is 2-fold of the charging voltage Vbat). That is, it is required for the bus voltage Vbus to be greater than or equal to 7V.

In this embodiment, as shown in FIG. 22, selectively, the tracking control circuit 26 can control the inductive switching power converter 251 to operate in the first short circuit conduction mode and control the capacitive switching power converter 252 to operate in the second regulation mode. Besides, the tracking control circuit 26 can request the power delivery unit 21 to output a constant current via the above-mentioned communication interface CB, so as to operate in the high power mode. To elaborate in more detail, in this embodiment, the bus current Ibus of the power delivery unit 21 is regulated to 2 A. In the first short circuit conduction mode and in the second regulation mode, the first current I1 and the charging current Ibat are 2 A and 4 A, respectively, and the first voltage V1 and the bus voltage Vbus are both 7V (i.e., corresponding to 2-fold of the charging voltage Vbat).

From one perspective, according to the explanations of the previous embodiments, the principles as to how the tracking control circuit 26 determines that the inductive switching power converter 251 operates in the first short circuit conduction mode and the capacitive switching power converter 252 operates in the second short circuit conduction mode can be summarized as below.

In one embodiment, when the bus voltage Vbus of the bus power is lower than a first threshold Vth1, the inductive switching power converter 251 operates in the first short circuit conduction mode. In one embodiment, the first threshold Vth1 is correlated with the first voltage V1. When the capacitive switching power converter 252 operates in the second regulation mode, the first voltage V1 is k-fold of the charging voltage Vbat; therefore in such embodiment, the first threshold Vth1 is correlated with k*Vbat. Besides, when the capacitive switching power converter 252 operates in the second short circuit conduction mode, the first voltage V1 is equal to the charging voltage Vbat; therefore in such embodiment, the first threshold Vth1 is correlated with Vbat.

To be more specific, for example, assuming that in the first regulation mode, the inductive switching power converter 251 has a maximum duty ratio Dmax, in the embodiment where the capacitive switching power converter 252 operates in the second regulation mode, the first threshold Vth1 can be derived by the following equation:

$$Vth1 = Vbat * k/Dmax,$$

wherein Dmax denotes a real number greater than or equal to zero and smaller than one.

In addition, when the power delivery unit 21 can deliver a constant bus current Ibus, as shown by the embodiment in FIG. 19 or the embodiment in FIG. 21, the inductive switching power converter 251 can be controlled to operate in the first short circuit conduction mode, which can enhance the power conversion efficiency of the charging system 2f, as described above.

From another perspective, in one embodiment, when the power delivery unit 21 can deliver a constant bus current Ibus and when the bus voltage Vbus is variable and exceeds Vbat*k, the inductive switching power converter 251 can be controlled to operate in the first short circuit conduction mode and the capacitive switching power converter 252 can be controlled to operate in the second regulation mode.

On the other hand, when the bus voltage Vbus of the bus power is lower than the second threshold Vth2, the capacitive switching power converter 252 operates in the second short circuit conduction mode, wherein the second threshold Vth2 is correlated with the charging voltage Vbat. When the capacitive switching power converter 252 operates in the second regulation mode, the first voltage V1 is k-fold of the charging voltage Vbat and the bus voltage Vbus is greater than or equal to the first voltage V1; therefore, in one embodiment, the second threshold Vth2 is correlated with k*Vbat; more specifically, in one preferred embodiment, Vth2≥k*Vbat.

Additionally, because the maximum duty ratio Dmax is generally smaller than one, when the inductive switching power converter 251 operates in the first regulation mode, it is required for the bus voltage Vbus to be greater than the first voltage V1. Therefore, in one embodiment, the first threshold Vth1 is higher than the second threshold Vth2.

As exemplified by the embodiment in FIG. 20 and the embodiment in FIG. 21, when the voltage level of the bus voltage Vbus is too low and fail to fulfill the criteria for the capacitive switching power converter 252 to operate in the second regulation mode, the tracking control circuit 26 can determine to control the capacitive switching power converter 252 to operate in the second short circuit conduction mode.

In light of above, in one embodiment, when the inductive switching power converter 251 is a buck switching power converter, and when the bus voltage Vbus is programmable and smaller than a first threshold Vth1, the upper gate switch of the switching devices is fully ON, so as to short-circuit the bus power Vbus to the first power V1.

In one embodiment, when a bus power Vbus is lower than a second threshold Vth2, a part of the plural switches are fully ON, so as to short-circuit the first power V1 to the charging power Vbat.

In one embodiment, the above-mentioned tracking control circuit 26 for example can be a microcontroller, which is configured to operably control a bus voltage Vbus and/or a bus current Ibus of the bus power via a communication interface.

Besides, In one embodiment, based upon a combination of the above-mentioned different operation modes, the tracking control circuit 26 can control the bus voltage Vbus and/or the bus current Ibus of the bus power, such that the charging circuit 25 operates at a maximum efficiency operation point.

Figure 23:
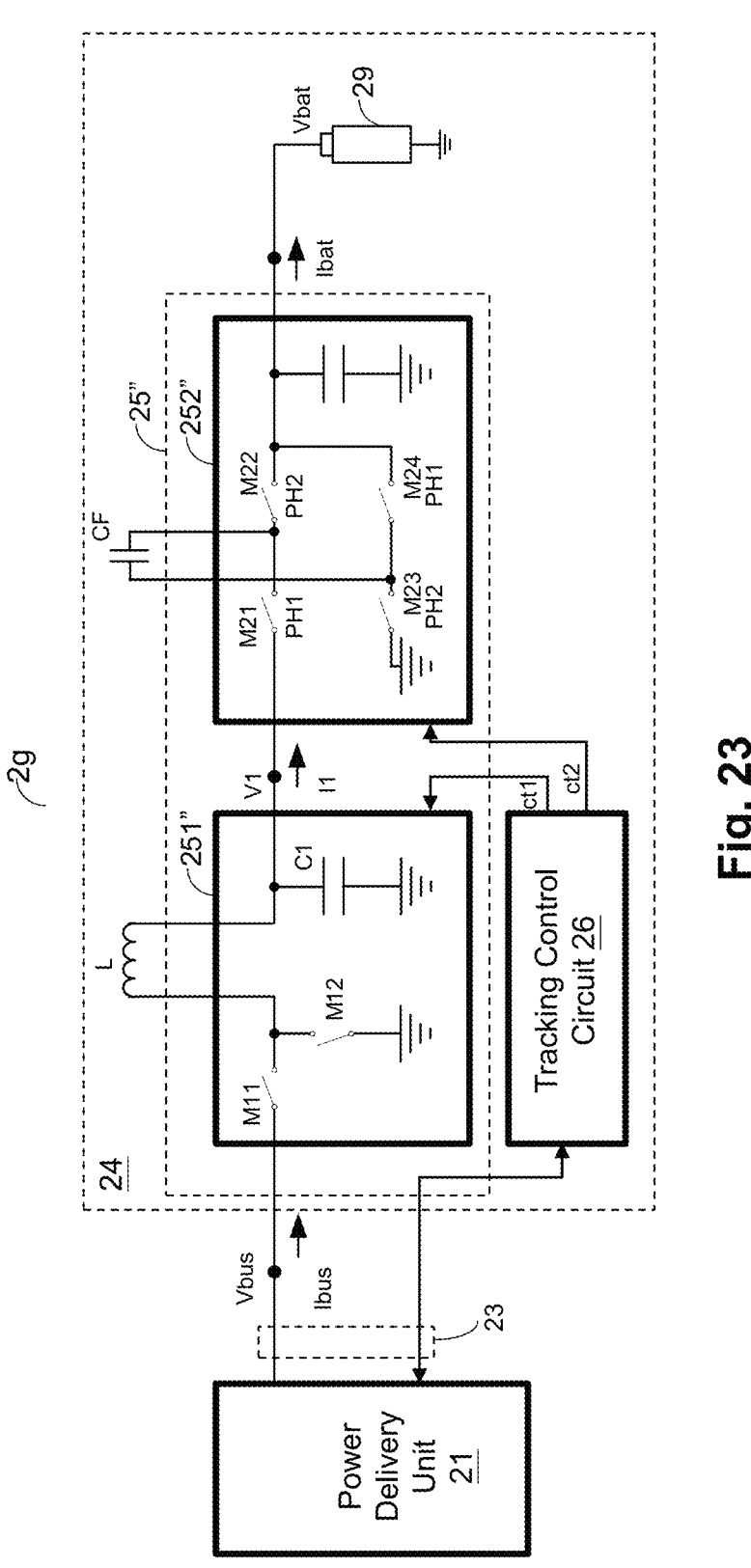
FIG. 23 shows a charging circuit of a charging system according to an embodiment of the present invention.

Please refer to FIG. 23, which shows a charging circuit 25" of a charging system 2g according to an embodiment of the present invention. This embodiment of FIG. 23 is similar to the previous embodiments, but in this embodiment, the inductor L and the conversion capacitor CF are not included in the charging circuit 25". That is, the inductive switching power converter 251" controls the inductor L, whereas, the capacitive switching power converter 252" controls the conversion capacitor CF. In one embodiment, the inductive switching power converter 251", the capacitive switching power converter CF 252" and the tracking control circuit 26 are integrated into an integrated circuit (IC). That is, the charging circuit 25" is an integrated circuit (IC).

In the embodiments of FIG. 14 to FIG. 16 and the embodiments of FIG. 18 to FIG. 23, a buck type inductive switching power converter and a capacitor voltage divider are employed to demonstrate the operation mechanisms of the present invention. In other embodiments other types of inductive switching power converter and capacitive switching power converter can be employed, and the above-mentioned current magnification ratio k and the relationship of the thresholds cab be correspondingly modified depending upon the combination of power converters. Those skilled in this art can readily conceive variations and modifications within the spirit of the present invention, so the details thereof are not redundantly explained here.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of step in one embodiment can be used to replace a corresponding part of step in another embodiment. In view of the foregoing, the spirit of the present invention should cover all such and other modifications and variations, which should be interpreted to fall within the scope of the following claims and their equivalents.

What is claimed is:

1. A charging control method configured to control a charging system, comprising:

converting an input power to a DC power;

receiving the DC power via a detachable cable, so as to generate a bus power; and converting the bus power to a charging power configured to charge a battery in a charging period;

wherein the step of converting the bus power to the charging power includes:

based on a relationship between the DC power and the charging power, operating an inductive switching power converter to selectively either convert the bus power into a first power in a first regulation mode or bypass the bus power into the first power in a first short circuit conduction mode; and based on the relationship between the DC power and the charging power, operating a capacitive switching power converter to selectively either convert the first power into the charging power in a second regulation mode or bypass the first power into the charging power in a second short circuit conduction mode;

wherein the step of converting the input power to the DC power includes:

adaptively adjusting the DC power based on power conversion efficiency feedback to track a maximum power conversion efficiency of the charging system, in combination with selectively operating the inductive switching power converter in either the first regulation mode or the first short circuit conduction mode, and operating the capacitive switching power converter in either the second regulation mode or the second short circuit conduction mode, based on the DC power and the charging power.

2. The charging control method of claim 1, wherein the step of adjusting the DC power to track the maximum power conversion efficiency includes the following steps:

S11: obtaining a power conversion efficiency according to the DC power;

S12: subsequent to the step S11, positively or negatively adjusting the DC power;

S13: obtaining an adjusted power conversion efficiency according to the adjusted DC power;

21

22

S14: subsequent to the step S13, comparing the adjusted power conversion efficiency with the power conversion efficiency before adjustment;

S15: subsequent to the step S14, when the adjusted power conversion efficiency is higher than the power conversion efficiency before adjustment, adjusting the DC power in a same manner as the step S12 and executing the step S13; and S16: subsequent to the step S14, when the adjusted power conversion efficiency is not higher than the power conversion efficiency before adjustment, adjusting the DC power in an opposite manner as the step S12 and executing the step S13.

3. The charging control method of claim 1, wherein the DC power includes a DC voltage and/or a DC current.

4. The charging control method of claim 1, wherein during the charging period, a charging voltage and/or a charging current of the charging power is constant.

5. The charging control method of claim 1, wherein the input power includes an input voltage and an input current, wherein the input voltage is constant; wherein the step of adjusting the DC power includes adjusting the DC power to track a minimum of the input current, so as to track the maximum power conversion efficiency.

6. The charging control method of claim 1, wherein the input power includes an input voltage and an input current; wherein the input voltage and/or the input current is detected and obtained by an analog digital conversion (ADC) circuit or wherein the input voltage and/or the input current is detected and obtained according to a DC voltage of the DC power and a look up table.

7. The charging control method of claim 1, wherein the step of converting the bus power to the charging power is achieved by one of the following:

when a bus voltage of the bus power is lower than a first threshold, operating the inductive switching power converter in the first regulation mode, wherein the first threshold is correlated with a charging voltage of the charging power;

when the bus voltage of the bus power is lower than a second threshold, operating the capacitive switching power converter in the second short circuit conduction mode, wherein the second threshold is correlated with a product of the charging voltage multiplied by a current magnification ratio, wherein the current magnification ratio is a ratio of a charging current of the charging power to a first current of the first power;

when a bus current of the bus power is constant, operating the inductive switching power converter in the first short circuit conduction mode;

when the bus current of the bus power is constant, and when the bus voltage is variable and exceeds the second threshold, operating the inductive switching power converter in the first short circuit conduction mode and operating the capacitive switching power converter in the second regulation mode.

8. A charging system, comprising:

a power delivery unit, which is configured to operably convert an input power to a DC power;

a detachable cable, which is configured to operably receive the DC power, and generate a bus power; and a charging circuit, which is configured to operably convert the bus power to a charging power to charge a battery in a charging period;

wherein the charging circuit includes an inductive switching power converter and a capacitive switching power converter, wherein the inductive switching power converter is configured to convert the bus power into a first power, and the capacitive switching power converter is configured to convert the first power into the charging power;

wherein based on a relationship between the DC power and the charging power, the inductive switching power converter is configured to selectively operate in either a first regulation mode or a first short circuit conduction mode, and the capacitive switching power converter is configured to selectively operate in either a second regulation mode or a second short circuit conduction mode; wherein in the first regulation mode, the inductive switching power converter regulates the first power to a predetermined target;

in the second regulation mode, the capacitive switching power converter regulates the charging power to a predetermined target;

in the first short circuit conduction mode, the inductive switching power converter short-circuits the bus power to the first power; and in the second short circuit conduction mode, the capacitive switching power converter short-circuits the first power to the charging power;

wherein the power delivery unit is configured to adaptively adjust the DC power based on power conversion efficiency feedback to track a maximum power conversion efficiency of the charging system, in combination with selectively operating the inductive switching power converter in either the first regulation mode or the first short circuit conduction mode, and operating the capacitive switching power converter in either the second regulation mode or the second short circuit conduction mode, based on the DC power and the charging power.

9. The charging system of claim 8, wherein the power delivery unit is configured to adjust the DC power so as to track the maximum power conversion efficiency by steps including:

S11: obtaining a power conversion efficiency according to the DC power;

S12: subsequent to the step S11, positively or negatively adjusting the DC power;

S13: obtaining an adjusted power conversion efficiency according to the adjusted DC power;

S14: subsequent to the step S13, comparing the adjusted power conversion efficiency with the power conversion efficiency before adjustment;

S15: subsequent to the step S14, when the adjusted power conversion efficiency is higher than the power conversion efficiency before adjustment, adjusting the DC power in a same manner as the step S12 and executing the step S13; and S16: subsequent to the step S14, when the adjusted power conversion efficiency is not higher than the power conversion efficiency before adjustment, adjusting the DC power in an opposite manner as the step S12 and executing the step S13.

10. The charging system of claim 8, wherein the DC power includes a DC voltage and/or a DC current.

11. The charging system of claim 8, wherein during the charging period, a charging voltage and/or a charging current of the charging power is constant.

12. The charging system of claim 10, wherein the input power includes an input voltage and an input current, wherein the input voltage is constant; wherein the DC power is adjusted to track a minimum of the input current, so as to track the maximum power conversion efficiency.

13. The charging system of claim 9, wherein the detachable cable includes:

a power line, which is configured to operably receive the DC power, so as to generate the bus power; and a communication bus coupled between the power delivery unit and the charging circuit, wherein the communication bus is configured to operably transmit a signal related to the DC power, a signal related to the bus power and/or a signal related to the charging power.

14. The charging system of claim 13, further comprising:

a tracking control circuit, which is coupled between the power delivery unit and the charging circuit and which is configured to operably generate a communication signal according to the power conversion efficiency, wherein the communication signal is transmitted to the power delivery unit via the communication bus, for adjusting the DC power to track the maximum power conversion efficiency.

15. The charging system of claim 8, wherein the power delivery unit detects and obtains an input voltage and an input current of the input power by an analog digital conversion (ADC) circuit in the power delivery unit; or, wherein the power delivery unit detects and obtains the input voltage and the input current of the input power according to a DC voltage of the DC power and a look up table.

16. The charging system of claim 8, wherein:

the inductive switching power converter includes a plurality of first switching devices, which are configured to operably switch a coupling relationship between an inductor and the bus power and a coupling relationship between the inductor and the first power, so as to convert the bus power to the first power; and the capacitive switching power converter includes a plurality of second switching devices, which are configured to operably switch a coupling relationship between a conversion capacitor and the first power and a coupling relationship between the conversion capacitor and the charging power, so as to convert the first power to the charging power;

wherein in the first regulation mode, the plurality of the first switching devices are configured to switch the inductor, so as to regulate the first power to a first predetermined target, and wherein in the first short circuit conduction mode, at least one of the plurality of first switching devices is controlled to be conductive, so as to short-circuit the bus power to the first power, wherein the at least one of the plurality of the first switching devices switches periodically in the first regulation mode;

wherein in the second regulation mode, the plurality of the second switching devices are configured to switch the conversion capacitor, so as to regulate the charging power to a second predetermined target, and wherein in the second short circuit conduction mode, at least one of the plurality of the second switching devices is controlled to be conductive, so as to short-circuit the first power to the charging power, wherein the at least one of the plurality of the second switching devices switches periodically in the second regulation mode.

17. The charging system of claim 16, wherein:

when a bus voltage of the bus power is lower than a first threshold, the inductive switching power converter operates in the first regulation mode, wherein the first threshold is correlated with a charging voltage of the charging power;

when the bus voltage of the bus power is lower than a second threshold, the capacitive switching power converter operates in the second short circuit conduction mode, wherein the second threshold is correlated with a product of the charging voltage multiplied by a current magnification ratio, wherein the current magnification ratio is a ratio of a charging current of the charging power to a first current of the first power;

when a bus current of the bus power is constant, the inductive switching power converter operates in the first short circuit conduction mode;

when the bus current of the bus power is constant, and when the bus voltage is variable and exceeds the second threshold, the inductive switching power converter operates in the first short circuit conduction mode and the capacitive switching power converter operates in the second regulation mode.

18. The charging system of claim 8, wherein the power delivery unit includes an AC-DC power converter or a DC-DC power converter.

19. The charging system of claim 8, wherein the power delivery unit includes a universal serial bus (USB) power delivery (PD) circuit.

20. The charging system of claim 8, wherein the capacitive switching power converter is a capacitor voltage divider.

21. The charging system of claim 17, wherein the inductive switching power converter is a buck switching power converter, and wherein when the DC power is programmable and is lower than the first threshold, an upper gate switch of the plurality of the first switching devices is fully conductive, so as to short-circuit the DC power and the first power.

22. The charging system of claim 17, wherein the first threshold is higher than the second threshold.

* * * * *